US010097448B1

(12) United States Patent
Howard et al.

(10) Patent No.: US 10,097,448 B1
(45) Date of Patent: *Oct. 9, 2018

(54) ROUTING MODE AND POINT-OF-PRESENCE SELECTION SERVICE

(71) Applicant: Amazon Technologies, Inc., Seattle, WA (US)

(72) Inventors: Craig Wesley Howard, Seattle, WA (US); Hardeep Singh Uppal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 79 days.

This patent is subject to a terminal disclaimer.

(21) Appl. No.: 14/575,816

(22) Filed: Dec. 18, 2014

(51) Int. Cl.
G06F 15/173 (2006.01)
H04L 12/707 (2013.01)
H04L 12/26 (2006.01)

(52) U.S. Cl.
CPC .......... *H04L 45/22* (2013.01); *H04L 43/0894* (2013.01)

(58) Field of Classification Search
CPC .......... H04L 45/00; H04L 45/22; H04L 45/28
USPC ........................................................ 709/239
See application file for complete search history.

(56) References Cited

U.S. PATENT DOCUMENTS 5,063,500 A 11/1991 Shorter
5,341,477 A 8/1994 Pitkin et al.
5,459,837 A 10/1995 Caccavale
5,611,049 A 3/1997 Pitts
5,701,467 A 12/1997 Freeston
5,764,910 A 6/1998 Shachar
(Continued)

FOREIGN PATENT DOCUMENTS

CA 2741 895 A1 5/2010
CN 1422468 A 6/2003
(Continued)

OTHER PUBLICATIONS

Office Action in Japanese Application No. 2011-502139 dated Aug. 17, 2015.
(Continued)

*Primary Examiner* — Alan S Chou
(74) *Attorney, Agent, or Firm* — Knobbe Martens Olson & Bear LLP

(57) ABSTRACT

Systems and methods for sloppy routing are provided. A client transmits a DNS query corresponding to a requested resource to a content delivery network (CDN) service provider. In some embodiments, the CDN service provider processes the DNS query to determine whether a threshold content delivery bandwidth has been exceeded by data links at cache servers. In other embodiments, additionally or alternatively, the CDN service provider determines whether a content provider has exceeded a threshold network usage that indicates a price at which the CDN service provider to provide content on behalf of the content provider. Using both or either of these thresholds, the CDN service provider can further process the DNS query by providing an alternative resource identifier or a cache IP address, both associated with an alternative POP. In some embodiments, the CDN service provider determines a routing mode for the response to the DNS query.

20 Claims, 10 Drawing Sheets

(56) References Cited

U.S. PATENT DOCUMENTS

| | | |
|---|---|---|
| 5,774,660 A | 6/1998 | Brendel et al. |
| 5,852,717 A | 12/1998 | Bhide et al. |
| 5,892,914 A | 4/1999 | Pitts |
| 5,893,116 A | 4/1999 | Simmonds et al. |
| 5,895,462 A | 4/1999 | Toki |
| 5,905,248 A | 5/1999 | Russell et al. |
| 5,933,811 A | 8/1999 | Angles et al. |
| 5,937,427 A | 8/1999 | Shinagawa et al. |
| 5,974,454 A | 10/1999 | Apfel et al. |
| 5,991,306 A | 11/1999 | Burns et al. |
| 5,999,274 A | 12/1999 | Lee et al. |
| 6,016,512 A | 1/2000 | Huitema |
| 6,018,619 A | 1/2000 | Allard et al. |
| 6,026,452 A | 2/2000 | Pitts |
| 6,038,601 A | 3/2000 | Lambert et al. |
| 6,052,718 A | 4/2000 | Gifford |
| 6,078,960 A | 6/2000 | Ballard |
| 6,085,234 A | 7/2000 | Pitts et al. |
| 6,092,100 A | 7/2000 | Berstis et al. |
| 6,098,096 A | 8/2000 | Tsirigotis et al. |
| 6,108,703 A | 8/2000 | Leighton et al. |
| 6,128,279 A | 10/2000 | O'Neil et al. |
| 6,151,631 A | 11/2000 | Ansell et al. |
| 6,157,942 A | 12/2000 | Chu et al. |
| 6,167,438 A | 12/2000 | Yates et al. |
| 6,167,446 A | 12/2000 | Lister et al. |
| 6,173,316 B1 | 1/2001 | De Boor et al. |
| 6,182,111 B1 | 1/2001 | Inohara et al. |
| 6,182,125 B1 | 1/2001 | Borella et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |
| 6,243,761 B1 | 6/2001 | Mogul et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,324,580 B1 | 11/2001 | Jindal et al. |
| 6,330,602 B1 | 12/2001 | Law et al. |
| 6,338,082 B1 | 1/2002 | Schneider |
| 6,345,308 B1 | 2/2002 | Abe |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,377,257 B1 | 4/2002 | Borrel et al. |
| 6,386,043 B1 | 5/2002 | Millins |
| 6,405,252 B1 | 6/2002 | Gupta et al. |
| 6,408,360 B1 | 6/2002 | Chamberlain et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,442,165 B1 | 8/2002 | Sitaraman et al. |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,484,161 B1 | 11/2002 | Chipalkatti et al. |
| 6,493,765 B1 | 12/2002 | Cunningham et al. |
| 6,505,241 B2 | 1/2003 | Pitts |
| 6,523,036 B1 | 2/2003 | Hickman et al. |
| 6,529,910 B1 | 3/2003 | Fleskes |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,611,873 B1 | 8/2003 | Kanehara |
| 6,622,168 B1 | 9/2003 | Datta |
| 6,643,357 B2 | 11/2003 | Lumsden |
| 6,643,707 B1 | 11/2003 | Booth |
| 6,654,807 B2 | 11/2003 | Farber et al. |
| 6,658,462 B1 | 12/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,694,358 B1 | 2/2004 | Swildens et al. |
| 6,697,805 B1 | 2/2004 | Choquier et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 | 9/2004 | Kumar et al. |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,862,607 B1 | 3/2005 | Vermeulen |
| 6,868,439 B2 | 3/2005 | Basu et al. |
| 6,874,017 B1 | 3/2005 | Inoue et al. |
| 6,917,951 B2 | 7/2005 | Orbits et al. |
| 6,925,499 B1 | 8/2005 | Chen et al. |
| 6,928,467 B2 | 8/2005 | Peng et al. |
| 6,928,485 B1 | 8/2005 | Krishnamurthy et al. |
| 6,941,562 B2 | 9/2005 | Gao et al. |
| 6,963,850 B1 | 11/2005 | Bezos et al. |
| 6,976,090 B2 | 12/2005 | Ben-Shaul et al. |
| 6,981,017 B1 | 12/2005 | Kasriel et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,031,445 B2 | 4/2006 | Lumsden |
| 7,032,010 B1 | 4/2006 | Swildens et al. |
| 7,058,633 B1 | 6/2006 | Gnagy et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,114,160 B2 | 9/2006 | Suryanarayana et al. |
| 7,117,262 B2 | 10/2006 | Bai et al. |
| 7,133,905 B2 | 11/2006 | Dilley et al. |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,174,382 B2 | 2/2007 | Ramanathan et al. |
| 7,185,063 B1 | 2/2007 | Kasriel et al. |
| 7,185,084 B2 | 2/2007 | Sirivara et al. |
| 7,188,214 B1 | 3/2007 | Kasriel et al. |
| 7,194,522 B1 | 3/2007 | Swildens et al. |
| 7,194,552 B1 | 3/2007 | Schneider |
| 7,200,667 B2 | 4/2007 | Teodosiu et al. |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,228,359 B1 | 6/2007 | Monteiro |

(56) References Cited

U.S. PATENT DOCUMENTS

| | | |
|---|---|---|
| 7,233,978 B2 | 6/2007 | Overton et al. |
| 7,240,100 B1 | 7/2007 | Wein et al. |
| 7,249,196 B1 | 7/2007 | Peiffer et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,272,227 B1 | 9/2007 | Beran |
| 7,274,658 B2 | 9/2007 | Bornstein et al. |
| 7,284,056 B2 | 10/2007 | Ramig |
| 7,289,519 B1 | 10/2007 | Liskov |
| 7,293,093 B2 | 11/2007 | Leighton |
| 7,308,499 B2 | 12/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,337,968 B2 | 3/2008 | Wilz, Sr. et al. |
| 7,339,937 B2 | 3/2008 | Mitra et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,372,809 B2 | 5/2008 | Chen |
| 7,373,416 B2 | 5/2008 | Kagan et al. |
| 7,376,736 B2 | 5/2008 | Sundaram et al. |
| 7,380,078 B2 | 5/2008 | Ikegaya et al. |
| 7,389,354 B1 | 6/2008 | Sitaraman et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,409,712 B1 | 8/2008 | Brooks et al. |
| 7,430,610 B2 | 9/2008 | Pace et al. |
| 7,441,045 B2 | 10/2008 | Skene et al. |
| 7,441,261 B2 | 10/2008 | Slater et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,506,034 B2 | 3/2009 | Coates et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,594,189 B1 | 9/2009 | Walker et al. |
| 7,596,619 B2 | 9/2009 | Leighton et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,684,394 B1 | 3/2010 | Cutbill et al. |
| 7,685,109 B1 | 3/2010 | Ransil et al. |
| 7,685,251 B2 | 3/2010 | Houlihan et al. |
| 7,693,813 B1 | 4/2010 | Cao et al. |
| 7,693,959 B2 | 4/2010 | Leighton et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,853,719 B1 | 12/2010 | Cao et al. |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,108,623 B2 | 1/2012 | Krishnaprasad et al. |

(56) References Cited

U.S. PATENT DOCUMENTS

| | | |
|---|---|---|
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |
| 8,156,199 B1 | 4/2012 | Hoche-Mong et al. |
| 8,156,243 B2 | 4/2012 | Richardson et al. |
| 8,175,863 B1 | 5/2012 | Ostermeyer et al. |
| 8,190,682 B2 | 5/2012 | Paterson-Jones et al. |
| 8,195,837 B2 | 6/2012 | McCarthy et al. |
| 8,224,971 B1 | 7/2012 | Miller et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,296,393 B2 | 10/2012 | Alexander et al. |
| 8,301,600 B1 | 10/2012 | Helmick et al. |
| 8,301,645 B1 | 10/2012 | Crook |
| 8,321,568 B2 | 11/2012 | Sivasubramanian et al. |
| 8,380,831 B2 | 2/2013 | Barber |
| 8,402,137 B2 | 3/2013 | Sivasuramanian et al. |
| 8,423,408 B1 | 4/2013 | Barnes et al. |
| 8,423,662 B1 | 4/2013 | Weihl et al. |
| 8,433,749 B2 | 4/2013 | Wee et al. |
| 8,447,831 B1 | 5/2013 | Sivasubramanian et al. |
| 8,447,876 B2 | 5/2013 | Verma et al. |
| 8,452,745 B2 | 5/2013 | Ramakrishna |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,880 B1 | 8/2013 | Richardson et al. |
| 8,521,908 B2 | 8/2013 | Holmes et al. |
| 8,526,405 B2 | 9/2013 | Curtis et al. |
| 8,527,639 B1 | 9/2013 | Liskov et al. |
| 8,527,658 B2 | 9/2013 | Holmes et al. |
| 8,549,646 B2 | 10/2013 | Stavrou et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,612,565 B2 | 12/2013 | Schneider |
| 8,615,549 B2 | 12/2013 | Knowles et al. |
| 8,619,780 B1 | 12/2013 | Brandwine |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 4/2014 | Richardson et al. |
| 8,712,950 B2 | 4/2014 | Smith et al. |
| 8,732,309 B1 | 5/2014 | Richardson et al. |
| 8,745,177 B1 | 6/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,812,727 B1 | 8/2014 | Sorenson, III et al. |
| 8,819,283 B2 | 8/2014 | Richardson et al. |
| 8,904,009 B1 | 12/2014 | Marshall et al. |
| 8,914,514 B1 | 12/2014 | Jenkins et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,935,744 B2 | 1/2015 | Osterweil et al. |
| 8,938,526 B1 | 1/2015 | Richardson et al. |
| 8,949,459 B1 | 2/2015 | Scholl |
| 8,966,318 B1 | 2/2015 | Shah |
| 8,972,580 B2 | 3/2015 | Fleischman et al. |
| 9,003,035 B1 | 4/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,106,701 B2 | 8/2015 | Richardson et al. |
| 9,116,803 B1 | 8/2015 | Agrawal et al. |
| 9,130,756 B2 | 9/2015 | Richardson et al. |
| 9,130,977 B2 | 9/2015 | Zisapel et al. |
| 9,137,302 B1 | 9/2015 | Makhijani et al. |
| 9,154,551 B1 | 10/2015 | Watson |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,458 B2 | 11/2015 | Richardson et al. |
| 9,195,996 B1 | 11/2015 | Walsh et al. |
| 9,208,097 B2 | 12/2015 | Richardson et al. |
| 9,210,235 B2 | 12/2015 | Sivasubramanian et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,294,391 B1 | 3/2016 | Mostert |
| 9,323,577 B2 | 4/2016 | Marr et al. |
| 9,332,078 B2 | 5/2016 | Sivasubramanian et al. |
| 9,386,038 B2 | 7/2016 | Martini |
| 9,391,949 B1 | 7/2016 | Richardson et al. |
| 9,407,676 B2 | 8/2016 | Archer et al. |
| 9,407,681 B1 | 8/2016 | Richardson et al. |
| 9,407,699 B2 | 8/2016 | Sivasubramanian et al. |
| 9,444,718 B2 | 9/2016 | Khakpour et al. |
| 9,444,759 B2 | 9/2016 | Richardson et al. |
| 9,479,476 B2 | 10/2016 | Richardson et al. |
| 9,495,338 B1 | 11/2016 | Hollis et al. |
| 9,497,259 B1 | 11/2016 | Richardson et al. |
| 9,515,949 B2 | 12/2016 | Richardson et al. |
| 9,525,659 B1 | 12/2016 | Sonkin et al. |
| 9,544,394 B2 | 1/2017 | Richardson et al. |
| 9,571,389 B2 | 2/2017 | Richardson et al. |
| 9,584,328 B1 | 2/2017 | Graham-cumming |
| 9,590,946 B2 | 3/2017 | Richardson et al. |
| 9,608,957 B2 | 3/2017 | Sivasubramanian et al. |
| 9,621,660 B2 | 4/2017 | Sivasubramanian et al. |
| 9,628,554 B2 | 4/2017 | Marshall et al. |
| 9,705,922 B2 | 7/2017 | Foxhoven et al. |
| 9,712,325 B2 | 7/2017 | Richardson et al. |
| 9,712,484 B1 | 7/2017 | Richardson et al. |
| 9,734,472 B2 | 8/2017 | Richardson et al. |
| 9,742,795 B1 | 8/2017 | Radlein et al. |
| 9,774,619 B1 | 9/2017 | Radlein et al. |
| 9,787,599 B2 | 10/2017 | Richardson et al. |
| 9,787,775 B1 | 10/2017 | Richardson et al. |
| 9,794,216 B2 | 10/2017 | Richardson et al. |
| 9,794,281 B1 | 10/2017 | Radlein et al. |

(56) References Cited

U.S. PATENT DOCUMENTS

| | | |
|---|---|---|
| 9,800,539 B2 | 10/2017 | Richardson et al. |
| 9,819,567 B1 | 11/2017 | Uppal et al. |
| 9,832,141 B1 | 11/2017 | Raftery |
| 9,887,915 B2 | 2/2018 | Richardson et al. |
| 9,887,931 B1 | 2/2018 | Uppal et al. |
| 9,887,932 B1 | 2/2018 | Uppal et al. |
| 9,888,089 B2 | 2/2018 | Sivasubramanian et al. |
| 2001/0000811 A1 | 5/2001 | May et al. |
| 2001/0025305 A1 | 9/2001 | Yoshiasa et al. |
| 2001/0027479 A1 | 10/2001 | Delaney et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010783 A1 | 1/2002 | Primak et al. |
| 2002/0010798 A1 | 1/2002 | Ben-Shaul et al. |
| 2002/0035624 A1 | 3/2002 | Jun-hyeong |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0083198 A1 | 6/2002 | Kim et al. |
| 2002/0087374 A1 | 7/2002 | Boubez et al. |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0143675 A1 | 10/2002 | Orshan |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0005111 A1 | 1/2003 | Allan |
| 2003/0007482 A1 | 1/2003 | Khello et al. |
| 2003/0009488 A1 | 1/2003 | Hart, III |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0070096 A1 | 4/2003 | Pazi et al. |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0112792 A1 | 6/2003 | Cranor et al. |
| 2003/0120741 A1 | 6/2003 | Wu et al. |
| 2003/0126387 A1 | 7/2003 | Watanabe |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0177321 A1 | 9/2003 | Watanabe |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010562 A1 | 1/2004 | Itonaga |
| 2004/0010563 A1 | 1/2004 | Forte et al. |
| 2004/0010588 A1 | 1/2004 | Slater et al. |
| 2004/0010601 A1 | 1/2004 | Afergan |
| 2004/0010621 A1 | 1/2004 | Afergan et al. |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0054757 A1 | 3/2004 | Ueda et al. |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |

(56) References Cited

U.S. PATENT DOCUMENTS

| | | |
|---|---|---|
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0117455 A1 | 6/2004 | Kaminksy et al. |
| 2004/0128344 A1 | 7/2004 | Trossen |
| 2004/0128346 A1 | 7/2004 | Melamed et al. |
| 2004/0148520 A1 | 7/2004 | Talpade et al. |
| 2004/0167981 A1 | 8/2004 | Douglas et al. |
| 2004/0167982 A1 | 8/2004 | Cohen et al. |
| 2004/0172466 A1 | 9/2004 | Douglas et al. |
| 2004/0184456 A1 | 9/2004 | Binding et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0246948 A1 | 12/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0147088 A1 | 7/2005 | Bao et al. |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0172080 A1 | 8/2005 | Miyauchi |
| 2005/0181769 A1 | 8/2005 | Kogawa |
| 2005/0188073 A1 | 8/2005 | Nakamichi et al. |
| 2005/0192008 A1 | 9/2005 | Desai et al. |
| 2005/0198170 A1 | 9/2005 | LeMay et al. |
| 2005/0198334 A1 | 9/2005 | Farber et al. |
| 2005/0198453 A1 | 9/2005 | Osaki |
| 2005/0198571 A1 | 9/2005 | Kramer et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 11/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 12/2005 | Agrawal et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0021001 A1 | 1/2006 | Giles et al. |
| 2006/0026067 A1 | 2/2006 | Nicholas et al. |
| 2006/0026154 A1 | 2/2006 | Altinel et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0045005 A1 | 3/2006 | Blackmore et al. |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0070060 A1 | 3/2006 | Tantawi et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0107036 A1 | 5/2006 | Randle et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0136453 A1 | 6/2006 | Kwan |
| 2006/0143293 A1 | 6/2006 | Freedman |
| 2006/0146820 A1 | 7/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173957 A1 | 8/2006 | Robinson |
| 2006/0179080 A1 | 8/2006 | Meek et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218256 A1 | 9/2006 | Farber et al. |
| 2006/0218304 A1 | 9/2006 | Mukherjee et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2007/0005689 A1 | 1/2007 | Leighton et al. |
| 2007/0005801 A1 | 1/2007 | Kumar et al. |

(56) References Cited

U.S. PATENT DOCUMENTS

| | | |
|---|---|---|
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0064610 A1 | 3/2007 | Khandani |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101061 A1 | 5/2007 | Baskaran et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156919 A1 | 7/2007 | Potti et al. |
| 2007/0162331 A1 | 7/2007 | Sullivan |
| 2007/0168336 A1 | 7/2007 | Ransil et al. |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2008/0005057 A1 | 1/2008 | Ozzie et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0056207 A1 | 3/2008 | Eriksson et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0101358 A1 | 5/2008 | Van Ewijk et al. |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256087 A1 | 10/2008 | Piironen et al. |
| 2008/0256175 A1 | 10/2008 | Lee et al. |
| 2008/0263135 A1 | 10/2008 | Olliphant |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0043900 A1 | 2/2009 | Barber |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0086728 A1 | 4/2009 | Gulati et al. |
| 2009/0086741 A1 | 4/2009 | Zhang |
| 2009/0089869 A1 | 4/2009 | Varghese |
| 2009/0094252 A1 | 4/2009 | Wong et al. |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0138533 A1 | 5/2009 | Iwasaki et al. |
| 2009/0144411 A1 | 6/2009 | Winkler et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |

(56) References Cited

U.S. PATENT DOCUMENTS

| | | |
|---|---|---|
| 2009/0164331 A1 | 6/2009 | Bishop et al. |
| 2009/0164614 A1 | 6/2009 | Christian et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0233623 A1 | 9/2009 | Johnson |
| 2009/0241167 A1 | 9/2009 | Moore |
| 2009/0248697 A1 | 10/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 11/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |
| 2010/0023621 A1 | 1/2010 | Ezolt et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0049862 A1 | 2/2010 | Dixon |
| 2010/0057894 A1 | 3/2010 | Glasser |
| 2010/0070603 A1 | 3/2010 | Moss et al. |
| 2010/0082320 A1 | 4/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0103837 A1 | 4/2010 | Jungck et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1* | 9/2010 | Wei .................. H04L 29/04 709/220 |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0332595 A1 | 12/2010 | Fullagar et al. |
| 2011/0010244 A1 | 1/2011 | Hatridge |
| 2011/0029598 A1 | 2/2011 | Arnold et al. |
| 2011/0040893 A1 | 2/2011 | Karaoguz et al. |
| 2011/0051738 A1 | 3/2011 | Xu |
| 2011/0055386 A1 | 3/2011 | Middleton et al. |
| 2011/0055714 A1 | 3/2011 | Vemulapalli et al. |
| 2011/0055921 A1 | 3/2011 | Narayanaswamy et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 4/2011 | Jana et al. |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0161461 A1 | 6/2011 | Niven-Jenkins |
| 2011/0166935 A1 | 7/2011 | Armentrout et al. |
| 2011/0182290 A1 | 7/2011 | Perkins |
| 2011/0191445 A1 | 8/2011 | Dazzi |
| 2011/0191449 A1 | 8/2011 | Swildens et al. |
| 2011/0191459 A1 | 8/2011 | Joshi |
| 2011/0196892 A1 | 8/2011 | Xia |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0320522 A1 | 12/2011 | Endres et al. |
| 2011/0320559 A1 | 12/2011 | Foti |
| 2012/0011190 A1 | 1/2012 | Driesen et al. |
| 2012/0023090 A1 | 1/2012 | Holloway et al. |
| 2012/0036238 A1 | 2/2012 | Sundaram et al. |
| 2012/0066360 A1 | 3/2012 | Ghosh |
| 2012/0072600 A1* | 3/2012 | Richardson ......... H04L 67/1097 709/226 |
| 2012/0078998 A1 | 3/2012 | Son et al. |
| 2012/0079115 A1 | 3/2012 | Richardson et al. |
| 2012/0089972 A1 | 4/2012 | Scheidel et al. |
| 2012/0096065 A1 | 4/2012 | Suit et al. |
| 2012/0110515 A1 | 5/2012 | Abramoff et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |

(56) References Cited

U.S. PATENT DOCUMENTS

| | | |
|---|---|---|
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 7/2012 | Berkes et al. |
| 2012/0173677 A1 | 7/2012 | Richardson et al. |
| 2012/0173760 A1 | 7/2012 | Jog et al. |
| 2012/0179796 A1 | 7/2012 | Nagaraj et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0198071 A1 | 8/2012 | Black et al. |
| 2012/0224516 A1 | 9/2012 | Stojanovski et al. |
| 2012/0226649 A1 | 9/2012 | Kovacs et al. |
| 2012/0233329 A1 | 9/2012 | Dickinson et al. |
| 2012/0233522 A1 | 9/2012 | Barton et al. |
| 2012/0233668 A1 | 9/2012 | Leafe et al. |
| 2012/0246129 A1 | 9/2012 | Rothschild et al. |
| 2012/0254961 A1 | 10/2012 | Kim et al. |
| 2012/0257628 A1 | 10/2012 | Bu et al. |
| 2012/0278831 A1 | 11/2012 | van Coppenolle et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0019311 A1 | 1/2013 | Swildens et al. |
| 2013/0034099 A1 | 2/2013 | Hikichi et al. |
| 2013/0041872 A1 | 2/2013 | Aizman et al. |
| 2013/0046869 A1 | 2/2013 | Jenkins et al. |
| 2013/0054675 A1 | 2/2013 | Jenkins et al. |
| 2013/0055374 A1 | 2/2013 | Kustarz et al. |
| 2013/0067530 A1 | 3/2013 | Spektor et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0080623 A1 | 3/2013 | Thireault |
| 2013/0080627 A1 | 3/2013 | Kukreja et al. |
| 2013/0080636 A1 | 3/2013 | Friedman et al. |
| 2013/0086001 A1 | 4/2013 | Bhogal et al. |
| 2013/0117282 A1 | 5/2013 | Mugali, Jr. et al. |
| 2013/0117849 A1 | 5/2013 | Golshan et al. |
| 2013/0130221 A1 | 5/2013 | Kortemeyer et al. |
| 2013/0133057 A1 | 5/2013 | Yoon et al. |
| 2013/0151646 A1 | 6/2013 | Chidambaram et al. |
| 2013/0191499 A1 | 7/2013 | Ludin et al. |
| 2013/0198341 A1 | 8/2013 | Kim |
| 2013/0212300 A1 | 8/2013 | Eggleston et al. |
| 2013/0227165 A1 | 8/2013 | Liu |
| 2013/0246567 A1 | 9/2013 | Green et al. |
| 2013/0254269 A1 | 9/2013 | Sivasubramanian et al. |
| 2013/0263256 A1 | 10/2013 | Dickinson et al. |
| 2013/0268616 A1 | 10/2013 | Sakata et al. |
| 2013/0279335 A1 | 10/2013 | Ahmadi |
| 2013/0305046 A1 | 11/2013 | Mankovski et al. |
| 2013/0311583 A1 | 11/2013 | Humphreys et al. |
| 2013/0311605 A1 | 11/2013 | Richardson et al. |
| 2013/0311989 A1 | 11/2013 | Ota et al. |
| 2013/0318153 A1 | 11/2013 | Sivasubramanian et al. |
| 2013/0339429 A1 | 12/2013 | Richardson et al. |
| 2013/0346567 A1 | 12/2013 | Richardson et al. |
| 2014/0006577 A1 | 1/2014 | Joe et al. |
| 2014/0007239 A1 | 1/2014 | Sharpe et al. |
| 2014/0019605 A1 | 1/2014 | Boberg |
| 2014/0022951 A1 | 1/2014 | Lemieux |
| 2014/0036675 A1 | 2/2014 | Wang et al. |
| 2014/0040478 A1 | 2/2014 | Hsu et al. |
| 2014/0053022 A1 | 2/2014 | Forgette et al. |
| 2014/0059120 A1 | 2/2014 | Richardson et al. |
| 2014/0059198 A1 | 2/2014 | Richardson et al. |
| 2014/0059379 A1 | 2/2014 | Ren et al. |
| 2014/0075109 A1 | 3/2014 | Richardson et al. |
| 2014/0082165 A1 | 3/2014 | Marr et al. |
| 2014/0082614 A1 | 3/2014 | Klein et al. |
| 2014/0089917 A1 | 3/2014 | Attalla et al. |
| 2014/0108672 A1 | 4/2014 | Ou et al. |
| 2014/0122698 A1 | 5/2014 | Batrouni et al. |
| 2014/0122725 A1 | 5/2014 | Batrouni et al. |
| 2014/0137111 A1 | 5/2014 | Dees et al. |
| 2014/0143320 A1 | 5/2014 | Sivasubramanian et al. |
| 2014/0149601 A1 | 5/2014 | Carney et al. |
| 2014/0164817 A1 | 6/2014 | Bartholomy et al. |
| 2014/0165061 A1 | 6/2014 | Greene et al. |
| 2014/0215019 A1 | 7/2014 | Ahrens |
| 2014/0257891 A1 | 9/2014 | Richardson et al. |
| 2014/0280679 A1 | 9/2014 | Dey et al. |
| 2014/0297870 A1 | 10/2014 | Eggleston et al. |
| 2014/0310402 A1 | 10/2014 | Giaretta et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0365666 A1 | 12/2014 | Richardson et al. |
| 2015/0006615 A1 | 1/2015 | Wainner et al. |
| 2015/0019686 A1 | 1/2015 | Backholm |
| 2015/0026407 A1 | 1/2015 | Mclellan et al. |
| 2015/0067171 A1 | 3/2015 | Yum |
| 2015/0074228 A1 | 3/2015 | Drake |
| 2015/0081842 A1 | 3/2015 | Richardson et al. |
| 2015/0088972 A1 | 3/2015 | Brand et al. |
| 2015/0089621 A1 | 3/2015 | Khalid |
| 2015/0154051 A1 | 6/2015 | Kruglick |
| 2015/0156279 A1 | 6/2015 | Vaswani et al. |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0180988 A1 | 6/2015 | Sivasubramanian et al. |
| 2015/0188734 A1 | 7/2015 | Petrov |
| 2015/0188994 A1 | 7/2015 | Marshall et al. |
| 2015/0189042 A1 | 7/2015 | Sun et al. |
| 2015/0195244 A1 | 7/2015 | Richardson et al. |
| 2015/0207733 A1 | 7/2015 | Richardson et al. |
| 2015/0215270 A1 | 7/2015 | Sivasubramanian et al. |
| 2015/0215656 A1 | 7/2015 | Pulung et al. |
| 2015/0229710 A1 | 8/2015 | Sivasubramanian et al. |
| 2015/0244580 A1 | 8/2015 | Saavedra |
| 2015/0249579 A1 | 9/2015 | Ellsworth et al. |
| 2015/0256647 A1 | 9/2015 | Richardson et al. |
| 2015/0288647 A1 | 10/2015 | Chhabra et al. |
| 2015/0319194 A1 | 11/2015 | Richardson et al. |
| 2015/0319260 A1 | 11/2015 | Watson |
| 2015/0334082 A1 | 11/2015 | Richardson et al. |
| 2016/0006672 A1 | 1/2016 | Saavedra |
| 2016/0021197 A1 | 1/2016 | Pogrebinsky et al. |
| 2016/0026568 A1 | 1/2016 | Marshall et al. |
| 2016/0028644 A1 | 1/2016 | Richardson et al. |
| 2016/0028755 A1 | 1/2016 | Vasseur et al. |
| 2016/0036857 A1 | 2/2016 | Foxhoven et al. |
| 2016/0041910 A1 | 2/2016 | Richardson et al. |
| 2016/0065665 A1 | 3/2016 | Richardson et al. |
| 2016/0072669 A1 | 3/2016 | Saavedra |
| 2016/0072720 A1 | 3/2016 | Richardson et al. |
| 2016/0088118 A1 | 3/2016 | Sivasubramanian et al. |
| 2016/0132600 A1 | 5/2016 | Woodhead et al. |
| 2016/0134492 A1 | 5/2016 | Ellsworth et al. |
| 2016/0142367 A1 | 5/2016 | Richardson et al. |
| 2016/0182454 A1 | 6/2016 | Phonsa et al. |
| 2016/0182542 A1 | 6/2016 | Staniford |
| 2016/0205062 A1 | 7/2016 | Mosert |
| 2016/0241637 A1 | 8/2016 | Marr et al. |
| 2016/0241639 A1 | 8/2016 | Brookins et al. |
| 2016/0241651 A1 | 8/2016 | Sivasubramanian et al. |
| 2016/0294678 A1 | 10/2016 | Khakpour et al. |
| 2016/0308959 A1 | 10/2016 | Richardson et al. |
| 2017/0041428 A1 | 2/2017 | Katsev |
| 2017/0085495 A1 | 3/2017 | Richardson et al. |
| 2017/0126557 A1 | 5/2017 | Richardson et al. |
| 2017/0126796 A1 | 5/2017 | Hollis et al. |

(56) References Cited

U.S. PATENT DOCUMENTS

| | | |
|---|---|---|
| 2017/0142062 A1 | 5/2017 | Richardson et al. |
| 2017/0153980 A1 | 6/2017 | Araújo et al. |
| 2017/0155678 A1 | 6/2017 | Araújo et al. |
| 2017/0180217 A1 | 6/2017 | Puchala et al. |
| 2017/0180267 A1 | 6/2017 | Puchala et al. |
| 2017/0214755 A1 | 7/2017 | Sivasubramanian et al. |
| 2017/0250821 A1 | 8/2017 | Richardson et al. |
| 2017/0257340 A1 | 9/2017 | Richardson et al. |
| 2017/0353395 A1 | 12/2017 | Richardson et al. |

FOREIGN PATENT DOCUMENTS

| | | |
|---|---|---|
| CN | 1511399 A | 7/2004 |
| CN | 1605182 A | 4/2005 |
| CN | 101189598 A | 5/2008 |
| CN | 101460907 A | 6/2009 |
| CN | 103731481 A | 4/2014 |
| EP | 1603307 A2 | 12/2005 |
| EP | 1351141 A2 | 10/2007 |
| EP | 2008167 A2 | 12/2008 |
| EP | 3156911 A1 | 4/2017 |
| JP | 07-141305 | 6/1995 |
| JP | 2001-0506093 | 5/2001 |
| JP | 2001-249907 | 9/2001 |
| JP | 2002-024192 | 1/2002 |
| JP | 2002-044137 | 2/2002 |
| JP | 2002-323986 | 11/2002 |
| JP | 2003-167810 A | 6/2003 |
| JP | 2003-167813 A | 6/2003 |
| JP | 2003-522358 A | 7/2003 |
| JP | 2003188901 A | 7/2003 |
| JP | 2004-070935 | 3/2004 |
| JP | 2004-532471 | 10/2004 |
| JP | 2004-533738 A | 11/2004 |
| JP | 2005-537687 | 12/2005 |
| JP | 2007-133896 A | 5/2007 |
| JP | 2007-207225 A | 8/2007 |
| JP | 2008-515106 | 5/2008 |
| JP | 2009-071538 A | 4/2009 |
| JP | 2012-509623 | 4/2012 |
| JP | 2012-209623 | 10/2012 |
| WO | WO 2002/069608 A2 | 9/2002 |
| WO | WO 2005/071560 A1 | 8/2005 |
| WO | WO 2007/007960 A1 | 1/2007 |
| WO | WO 2007/126837 A3 | 11/2007 |
| WO | WO 2009124006 A2 | 10/2009 |
| WO | WO 2010/002603 A1 | 1/2010 |
| WO | WO 2012/044587 | 4/2012 |
| WO | WO 2012065641 A1 | 5/2012 |
| WO | WO 2014/047073 A1 | 3/2014 |
| WO | WO 2017/106455 A1 | 6/2017 |

OTHER PUBLICATIONS

Third Office Action in Chinese Application No. 201180046104.0 dated Apr. 14, 2016.
Office Action in Japanese Application No. 2015-533132 dated Apr. 25, 2016.
Office Action in Canadian Application No. 2884796 dated Apr. 28, 2016.
Office Action in Japanese Application No. 2015-075644 dated Apr. 5, 2016 in 8 pages.
Office Action in Japanese Application No. 2011-516466 dated May 30, 2016.
Office Action in Russian Application No. 2015114568 dated May 16, 2016.
Office Action in Chinese Application No. 201310537815.9 dated Jul. 5, 2016.
Kenshi, P., "Help File Library: Iptables Basics," Justlinux, retrieved Dec. 1, 2005, from http://www.justlinux.com/nhf/Security/Iptables_Basics.html, 4 pages.
Office Action in Japanese Application No. 2014-225580 dated Oct. 26, 2015.
Second Office Action in Chinese Application No. 201180046104.0 dated Sep. 29, 2015.
Office Action in Canadian Application No. 2816612 dated Nov. 3, 2015.
Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
Fifth Office Action in Chinese Application No. 200980111426.1 dated Aug. 14, 2015.
"Non-Final Office Action dated Jan. 3, 2012," U.S. Appl. No. 12/652,541; dated Jan. 3, 2012; 35 pages.
"Final Office Action dated Sep. 5, 2012," U.S. Appl. No. 12/652,541; dated Sep. 5, 2012; 40 pages.
"Notice of Allowance dated Jan. 4, 2013," U.S. Appl. No. 12/652,541; dated Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Armour et al.: "A Heuristic Algorithm and Simulation Approach to Relative Location of Facilities"; Management Science, vol. 9, No. 2 (Jan. 1963); pp. 294-309.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Search Report for European Application No. 09839809.2 dated May 11, 2015.
First Office Action in Chinese Application No. 201180053405.6 dated May 3, 2015.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdeliverynetwork&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONG-MAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.

(56) References Cited

OTHER PUBLICATIONS

"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Baglioni et al., "Preprocessing and Mining Web Log Data for Web Personalization", LNAI 2829, 2003, pp. 237-249.
Barbir et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin "Distributed Firewalls," ;login;:37-39, Nov. 1999, http://www.cs.columbia.edu/-smb/papers/distfw. html, 10 pages, retrieved Nov. 11, 2005.
Blaze "Using the KeyNote Trust Management System," Mar. 1, 2001, from http://www.crypto.com/trustmgt/kn.html, 4 pages, retrieved May 17, 2006.
Brenton "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chipara et al, "Realtime Power-Aware Routing in Sensor Network", IEEE, 2006, 10 pages.
Clark "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson "Network Security Iptables," Apr. 2003, Linuxpro, Part 2, retrieved from http://davidcoulson.net/writing/lxf/38/iptables.pdf, 4 pages.
Coulson "Network Security Iptables," Mar. 2003, Linuxpro, Part 1, retrieved from http://davidcoulson.net/writing/lxf/39/iptables.pdf, 4 pages.
Decision of Refusal in Japanese Application No. 2011-516466 dated Jan. 16, 2015.
Decision of Rejection in Application No. 2011-502139 dated Jun. 30, 2014.
Deleuze et al., A DNS Based Mapping Peering System for Peering CDNs, draft-deleuze-cdnp-dnsmap-peer-00.txt, Nov. 20, 2000, 20 pages.
Demers "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Examination Report in Singapore Application No. 201006874-0 dated May 16, 2012.
Examination Report in Singapore Application No. 201103333-9 dated Aug. 13, 2013.
Examination Report in Singapore Application No. 201301573-0 dated Dec. 22, 2014.
First Office Action in Canadian Application No. 2741895 dated Feb. 25, 2013.
First Office Action in Chinese Application No. 200980111422.3 dated Apr. 13, 2012.
First Office Action in Chinese Application No. 200980111426.1 dated Feb. 16, 2013.
First Office Action in Chinese Application No. 200980119993.1 dated Jul. 4, 2012.
First Office Action in Chinese Application No. 200980119995.0 dated Jul. 6, 2012.
First Office Action in Chinese Application No. 200980145872.4 dated Nov. 29, 2012.
First Office Action in Chinese Application No. 201180046104.0 dated Nov. 3, 2014.
First Office Action in Japanese Application No. 2011-502138 dated Feb. 1, 2013.
First Office Action in Japanese Application No. 2011-502139 dated Nov. 5, 2013.
First Office Action in Japanese Application No. 2011-502140 dated Dec. 7, 2012.
First Office Action in Japanese Application No. 2011-503091 dated Nov. 18, 2013.
First Office Action in Japanese Application No. 2011-516466 dated Mar. 6, 2013.
First Office Action in Japanese Application No. 2013-529454 dated Feb. 3, 2014 in 6 pages.
First Office Action in Korean Application No. 10-2011-7002461 dated May 29, 2013.
First Office Action is Chinese Application No. 200980125551.8 dated Jul. 4, 2012.
First Office Action issued in Australian Application No. 2011307319 dated Mar. 6, 2014 in 5 pages.
First Singapore Written Opinion in Application No. 201006836-9, dated Oct. 12, 2011 in 12 pages.
Fourth Office Action in Chinese Application No. 200980111426.1 dated Jan. 15, 2015.
Gruener "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, In Proc. of Networking 2005, all pages.
Gunther et al, "Measuring Round Trip Times to determine the Distance between WLAN Nodes", Dec. 18, 2004, Technical University Berlin, all pages.
International Preliminary Report on Patentability in PCT/US2007/007601 dated Sep. 30, 2008 in 8 pages.
International Preliminary Report on Patentability in PCT/US2011/053302 dated Apr. 2, 2013.
International Preliminary Report on Patentability in PCT/US2011/061486 dated May 22, 2013.
International Search Report and Written Opinion in PCT/US07/07601 dated Jul. 18, 2008 in 11 pages.
International Search Report and Written Opinion in PCT/US2011/053302 dated Nov. 28, 2011 in 11 pages.
International Search Report and Written Opinion in PCT/US2011/061486 dated Mar. 30, 2012 in 11 pages.
Ioannidis et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Liu et al., "Combined mining of Web server logs and web contents for classifying user navigation patterns and predicting users' future requests," Data & Knowledge Engineering 61 (2007) pp. 304-330.

(56) References Cited

OTHER PUBLICATIONS

Maesono et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Office Action in Canadian Application No. 2726915 dated May 13, 2013.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 2 pages.
Office Action in Japanese Application No. 2013-529454 dated Mar. 9, 2015 in 8 pages.
Office Action in Japanese Application No. 2013-540982 dated Jun. 2, 2014.
Search Report and Written Opinion in Singapore Application No. 201103333-9 dated Nov. 19, 2012.
Search Report and Written Opinion in Singapore Application No. 201301573-0 dated Jul. 1, 2014.
Search Report and Written Opinion issued in Singapore Application No. 201006873-2 dated Oct. 12, 2011.
Second Office Action in Canadian Application No. 2741895 dated Oct. 21, 2013.
Second Office Action in Chinese Application No. 200980111426.1 dated Dec. 25, 2013.
Second Office Action in Chinese Application No. 200980119993.1 dated Mar. 12, 2013.
Second Office Action in Chinese Application No. 200980119995.0 dated Apr. 15, 2013.
Second Office Action in Japanese Application No. 2011-516466 dated Mar. 17, 2014.
Shankland "Sun to buy start-up to bolster N1 ," Jul. 30, 2003, CNet News.com, retrieved May 3, 2006, http://news.zdnet.com/2100-3513_22-5057752.html, 8 pages.
Singapore Examination Report in Application No. 201006837-7 dated Mar. 16, 2012.
Singapore Written Opinion in Application No. 201006836-9, dated Apr. 30, 2012 in 10 pages.
Singapore Written Opinion in Application No. 201006837-7, dated Oct. 12, 2011 in 11 pages.
Singapore Written Opinion in Application No. 201006874-0, dated Oct. 12, 2011 in 10 pages.
Strand "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Supplementary European Search Report in Application No. 07754164.7 dated Dec. 20, 2010 in 7 pages.
Supplementary European Search Report in Application No. 09727694.3 dated Jan. 30, 2012 in 6 pages.
Supplementary European Search Report in Application No. 09728756.9 dated Jan. 8, 2013.
Supplementary European Search Report in Application No. 09729072.0 2266064 dated Dec. 10, 2014.
Takizawa et al., "Scalable MultiReplication Framework on The Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Third Office Action in Chinese Application No. 200980111426.1 dated Jul. 7, 2014.
Third Office Action in Chinese Application No. 200980119993.1 dated Oct. 21, 2013.
Van Renesse, "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan "Terraspring Gives Sun's N1 a Boost," Nov. 25, 2002, Computerworld, retrieved May 3, 2006, from http://www.computerworld.com/printthis/2002/0,4814,76159,00.html, 3 pages.
Virtual Iron Software Home, Virtual Iron, retrieved May 3, 2006, from http://www.virtualiron.com/, 1 page.
Waldspurger, "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Written Opinion in Singapore Application No. 201303521-7 dated May 20, 2014.
Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zhu et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Sharif et al, "Secure In-VM Monitoring Using Hardware Virtualization", Microsoft, Oct. 2009 http://research.microsoft.com/pubs/153179/sim-ccs09.pdf; 11 pages.
Second Office Action in Chinese Application No. 201180053405.6 dated Dec. 4, 2015.
Office Action in European Application No. 07754164.7 dated Dec. 14, 2015.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Office Action in European Application No. 11767118.0 dated Feb. 3, 2017.
Office Action in European Application No. 09839809.2 dated Dec. 8, 2016.
Office Action in Japanese Application No. 2014-225580 dated Oct. 3, 2016.
Partial Supplementary Search Report in European Application No. 09826977.2 dated Oct. 4, 2016.
Office Action in Chinese Application No. 201310717573.1 dated Jul. 29, 2016.
Decision of Rejection in Chinese Application No. 201180046104.0 dated Oct. 17, 2016.
Office Action in Canadian Application No. 2816612 dated Oct. 7, 2016.
Supplementary Examination Report in Singapore Application No. 11201501987U dated May 17, 2017.
Office Action in Chinese Application No. 201310537815.9 dated Jun. 2, 2017.
International Search Report and Written Opinion in PCT/US/2016/066848 dated May 1, 2017.
International Search Report and Written Opinion in PCT/US2017/055156 dated Dec. 13, 2017.

(56) References Cited

OTHER PUBLICATIONS

Office Action in Canadian Application No. 2816612 dated Aug. 8, 2017.

* cited by examiner

ROUTING MODE AND POINT-OF-PRESENCE SELECTION SERVICE

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device ("client") and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
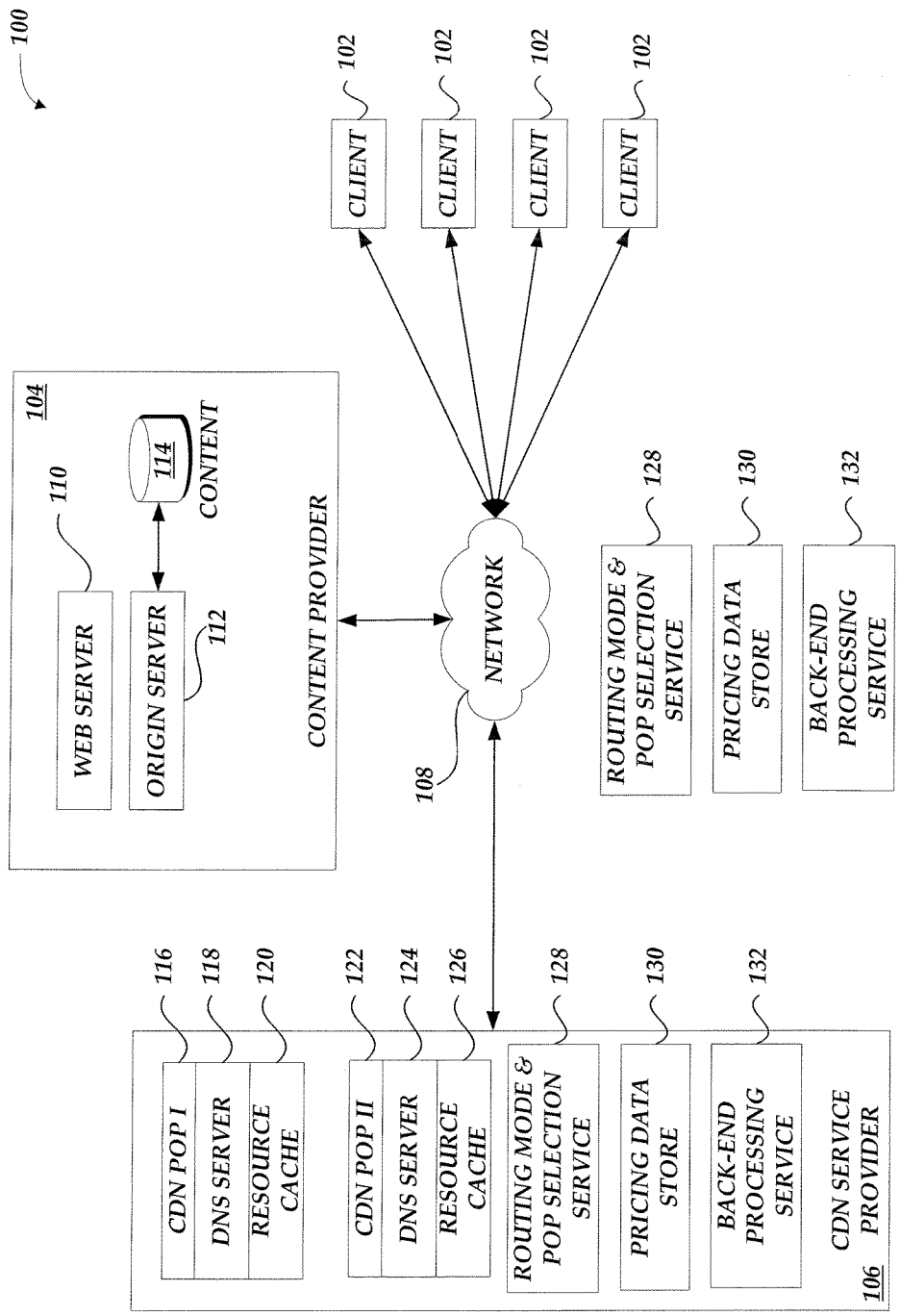
FIG. 1 is a block diagram illustrative of content delivery environment including a number of client computing devices, a content provider, and a content delivery network (CDN) service provider.

Generally described, the present disclosure is directed to DNS query processing that provides for the use of various routing modes responsive to receipt of a DNS query corresponding to a requested resource. More specifically, aspects of the disclosure will be described with regard to processing resource requests associated with content providers having a flat-rate pricing for use of a CDN service provider's computing devices. In some embodiments, in response to a DNS query corresponding to a requested resource, a CDN service provider may select a less optimal POP to service the requested resource based on one or more criteria and thereby select a "sloppy routing" scheme. For example, the one or more criteria may correspond to aspects of a flat-rate pricing model offered to content providers by the CDN service provider to provide content on their behalf. Continuing with this example, in such an approach, if a content provider has exceeded a threshold network usage, which may, for example, be based at least in part on pricing information for CDN service provider to provide content on behalf of the content provider, DNS query processing at a DNS server of the CDN service provider can include routing a response to the DNS query, in a "sloppy" routing manner and/or fashion, to a suboptimal POP by determining an alternative resource identifier or cache IP address at another POP (e.g., located at another edge server).

Further, aspects of the disclosure will be described with regard to DNS query processing that can determine a suboptimal, or sloppy, routing approach to avoid costs associated with data links of cache servers providing the requested resources. Accordingly, the one or more criteria used by the CDN service provider may also correspond to aspects of the CDN service provider cost information. More specifically, the data links, provisioned by a CDN service provider, can correspond to a financial cost for the content delivery bandwidth available on the data links of the cache servers. This financial cost can be determined in relation to a threshold content delivery bandwidth. For example, if a current content delivery bandwidth exceeds the threshold content delivery bandwidth, the CDN service provider incurs greater costs. In various embodiments, responses to DNS queries, such as an alternative resource identifier or a cache IP address, can be sloppy routed to another POP location with associated data links of cache servers operating below the threshold content delivery bandwidth.

In one embodiment, the one or more criteria for selecting a "sloppy routing" scheme includes a latency associated with providing requested resources for the content provider. In various other embodiments, other criteria that may affect the selection of sloppy routing for the response to a DNS query can include: optimizing content accessibility via hashing algorithms, security concerns, favoring certain content providers (e.g., customers), or favoring certain content uses.

Still further, aspects of the disclosure will be described with regard to DNS query processing for sloppy routing schemes using one or more criteria. The one or more criteria may include both the threshold network usage and the threshold content delivery bandwidth. For example, in such multi-criterion approach, the latency associated with routing a response of a DNS query to a suboptimal POP is considered in combination with the marginal cost to service a content request at a data link operating above the content delivery bandwidth threshold. Accordingly, a content provider that has exceeded a threshold network usage can be routed in a sloppy manner during a peak time, when other available data links of cache servers located at another POP are available at a lower cost or no cost because the data links of those cache servers are operating under the threshold content delivery bandwidth. Thus, a DNS server can use the one or more criteria to determine whether to use a suboptimal POP instead of an optimal or original POP.

Further aspects of the disclosure will be described with regard to determining an appropriate routing mode for providing a requested resource. In various embodiments, a spectrum of routing modes are available to the CDN service provider for use in responding to DNS queries. The routing modes can include: a default routing mode, a sloppy routing mode, a regional anycast routing mode, an anycast routing mode, and a "follow-the-moon" routing mode. (The "follow-the-moon" routing mode is described in U.S. patent application Ser. No. 14/229,568, titled "Scaling Computing Instances" and filed on Mar. 28, 2014, the entirety of which is incorporated herein by reference). The CDN service provider may determine a routing mode for providing a requested resource from a plurality of available routing modes based on one or more criteria. For example, the one or more criteria may include the network usage associated with the content provider, the content delivery bandwidth associated with the CDN service provider, a susceptibility factor associated with the content provider, or a latency associated with a POP in providing the requested resource. Additionally or alternatively, the one or more criteria may include one or more susceptibility factors and/or one or more latencies. For example, in one embodiment, the CDN service provider may determine that an anycast routing mode is appropriate if a susceptibility factor indicates that the anycast routing mode is a more appropriate routing mode when providing the requested resource. In another embodiment, the CDN service provider may determine that a default routing mode is appropriate if the one or more criteria indicate that a latency for providing the resource request is to be minimized. After selection of the routing mode, the CDN service provider may provide a response to the DNS query in accordance with the determined routing mode.

In another example, a regional anycast routing mode can be determined as the appropriate routing mode when the one or more criteria indicate that a susceptibility factor (e.g., a security concern) associated with the plurality of available routing modes is higher for a default routing mode, than the regional anycast routing mode. Continuing with this example, the response to the DNS query may be routed in accordance with the regional anycast routing mode so that several cache servers could be used to service the request, thereby enhancing security. In contrast, in the default routing mode, a cache server can be a single cache server (e.g., an optimal cache server with minimal latency for providing the resource request). Thus, the CDN service provider can provide responses to DNS queries in accordance with one of a plurality of available routing modes based on a variety of criteria.

Although various aspects of the disclosure will be described with regard to illustrative examples and embodiments, one skilled in the art will appreciate that the disclosed embodiments and examples should not be construed as limiting.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider and/or a CDN service provider. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

The client computing devices 102 may also include necessary hardware and software components for requesting content from network entities in the form of an originally requested resource that may include identifiers to two or more embedded resources that need to be requested. Further, the client computing devices 102 may include or be associated with necessary hardware and software components, such as browser software applications, plugins, scripts, etc., for fulfilling the original resource request and each embedded resource request. In other embodiments, the client computing devices 102 may be otherwise associated with an external proxy application or device, as well as any other additional software applications or software services, used in conjunction with requests for content.

Although not illustrated in FIG. 1, each client computing device 102 utilizes some type of local DNS resolver component, such as a DNS Name server, that generates the DNS queries attributed to the client computing device. In one embodiment, the local DNS resolver component may be provided by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider. Although the content delivery environment 100 is illustrated in a client-server configuration, one skilled in the relevant art will appreciate that the content delivery environment 100 may be implemented in a peer-to-peer configuration as well.

With continued reference to FIG. 1, the content delivery environment 100 can further include a CDN service provider 106 in communication with the client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of point of presence ("POP") locations 116 and 122 that correspond to nodes on the communication network 108. Each POP 116 and 122 includes a DNS server component 118 and 124 made up of a number of DNS server computing devices for resolving DNS queries from the client computers 102. Each POP 116 and 122 also includes a resource cache component 120 and 126 made up of a number of cache server computing devices for storing resources from content providers and transmitting various requested resources to various client computers. The DNS server components 118 and 124 and the resource cache components 120 and 126 may further include additional software and/or hardware components that facilitate communications including, but not limited, load balancing or load sharing software/hardware components.

In an illustrative embodiment, the DNS server components 118 and 124 and resource cache component 120 and 126 are considered to be logically grouped, regardless of whether the components, or portions of the components, are physically separate. Additionally, although the POPs 116 and 122 are illustrated in FIG. 1 as logically associated with the CDN service provider 106, the POPs can be geographically distributed throughout the communication network 108 to serve the various demographics of client computing devices 102. Additionally, one skilled in the relevant art will appreciate that the CDN service provider 106 can be associated with various additional computing resources, such additional computing devices for administration of content and resources, and the like.

The CDN service provider 106 can further include a routing mode and POP selection service 128, pricing data store 130, and back-end processing service 132. Illustratively, the routing mode and POP selection service 128 can implement various computational, statistical, or machine learning methods to route the response (e.g., an answer) to a DNS query received at the CDN service provider 106 (e.g., received at DNS server component 118). For example, the routing mode and POP selection service 128 can determine an appropriate routing mode for the alternative resource identifier (e.g., a CNAME) associated with the second DNS server 124 to the second POP 122 of the CDN service provider 106 or fort the IP address of a cache component in the resource cache 126 of the second POP 122. The routing mode and POP selection service 128 may include different modules or components, which may facilitate or implement various methods and processes described herein. Further, these modules or components may include additional components, systems, and subsystems for facilitating the methods and processes. Pricing data store 130 can include pricing information that indicates a price at which the CDN provider 106 provides content on behalf of the content provider 104. Pricing data store 130 can, additionally or alternatively, include cost information indicating a financial cost of content delivery bandwidth for the CDN service provider 106 (e.g., the costs to operate provisioned data links at cache servers). For example, in some embodiments, the pricing information can include a flat-rate price for monthly service for the content provider 104 by CDN provider 106.

Illustratively, back-end processing service 132 can include a number of hardware and software components. More specifically, the back-end processing service 132 may include hardware, software, configuration data, data structures, computer-readable code, or any type of information that can be loaded into memory and processed by back-end processing service 132. Aspects of the back-end processing service 132 will be described in further detail below with respect to FIG. 4 that illustrates the processing and storing service provided by back-end processing service 132. In various embodiments, reference to the routing mode and POP selection service 128 and back-end processing service 132 within the present disclosure may include multiple computing devices working in conjunction to facilitate the selecting of alternative resource identifiers or cached IP addresses at alternative POP locations to service content requests. For example, in various embodiments, the routing mode and POP selection service 128 may be distributed through a network or implemented by one or more virtual machine instances. Additionally or alternatively, it can be appreciated by one skilled in the art that the routing mode and POP selection service 128 and back-end processing service 132 may correspond to a combination thereof and/or include any other services, be centralized in one computing device, and/or be distributed across several computing devices.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
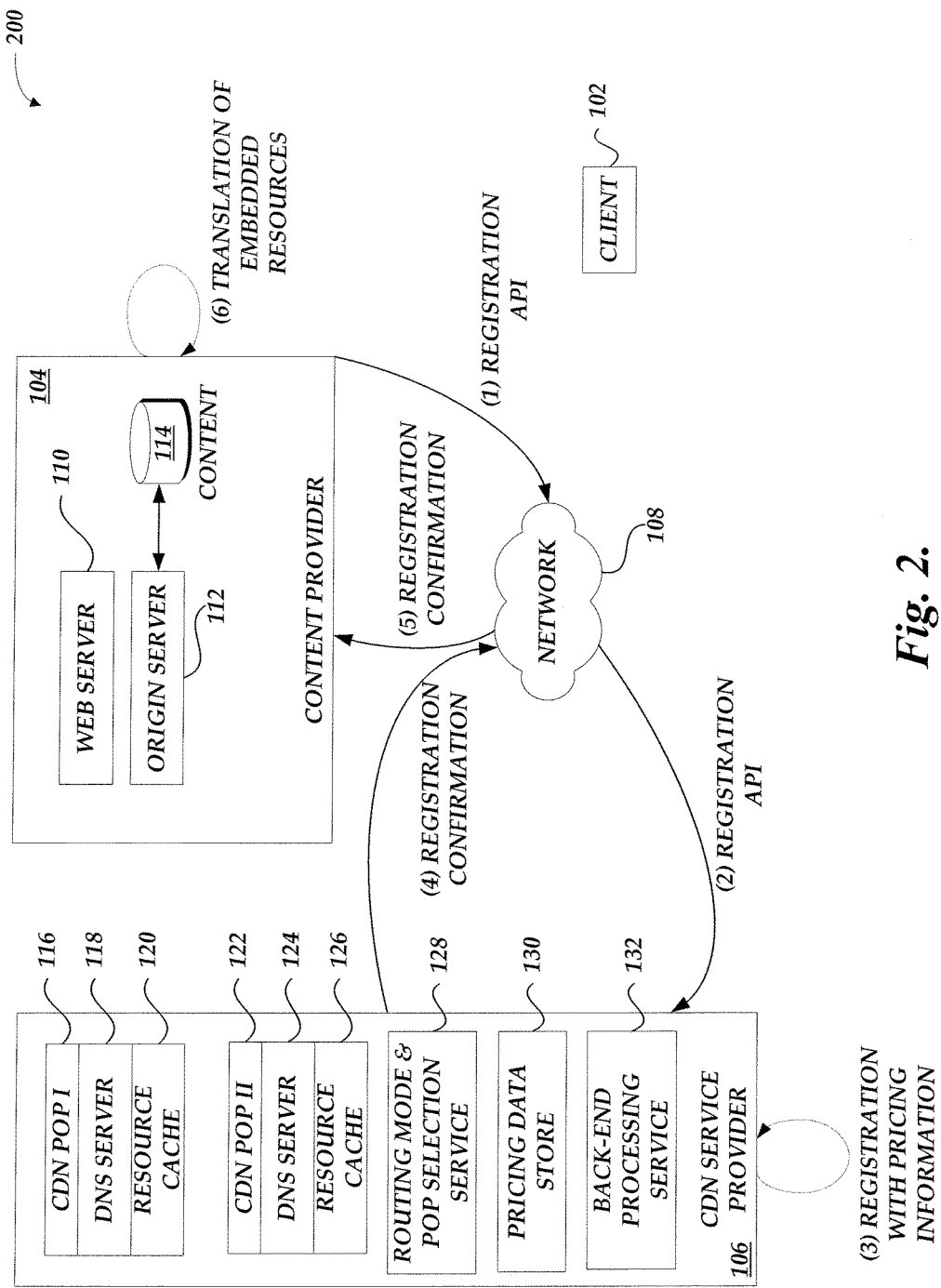
FIG. 2 is a block diagram of the content delivery environment of FIG. 1 illustrating the registration of a content provider with a CDN service provider.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a POP 116 and 122 associated with the CDN service provider 106. In the event that the resource cache component 120 and 126 of a selected POP does not have a copy of a resource requested by a client computing device 102, the resource cache component will request the resource from the origin server 112 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, client identifiers, such as client identification codes, content provider identifiers, such as content provider identification codes, executable code for processing resource identifiers, such as script-based instructions, the like. One skilled in the relevant art will appreciate that various types of additional information may be generated by the CDN service provider 106 and that the additional information may be embodied in any one of a variety of formats.

The CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 112 to a domain corresponding to the CDN service provider. The translated URLs are embedded into requested content in a manner such that DNS queries for the translated URLs will resolve to a DNS server corresponding to the CDN service provider 106 and not a DNS server corresponding to the content provider 104. Although the translation process is illustrated in FIG. 2, in some embodiments, the translation process may be omitted in a manner described in greater detail below.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider 104, the resource identifiers can be referred to generally as "content provider URLs." For purposes of an illustrative example, a content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the translated URLs resolve to a POP associated with the CDN service provider 106. In one embodiment, the translated URL identifies the domain of the CDN service provider 106 (e.g., "cdnprovider.com"), the same name of the resource to be requested (e.g., "resource.xxx") and the same path where the resource will be found (e.g., "path"). Additionally, the translated URL can include additional processing information (e.g., "additional information"). The translated URL would have the form of:

http://additional_information.cdnprovider.com/path/resources.xxx

Figure 3:
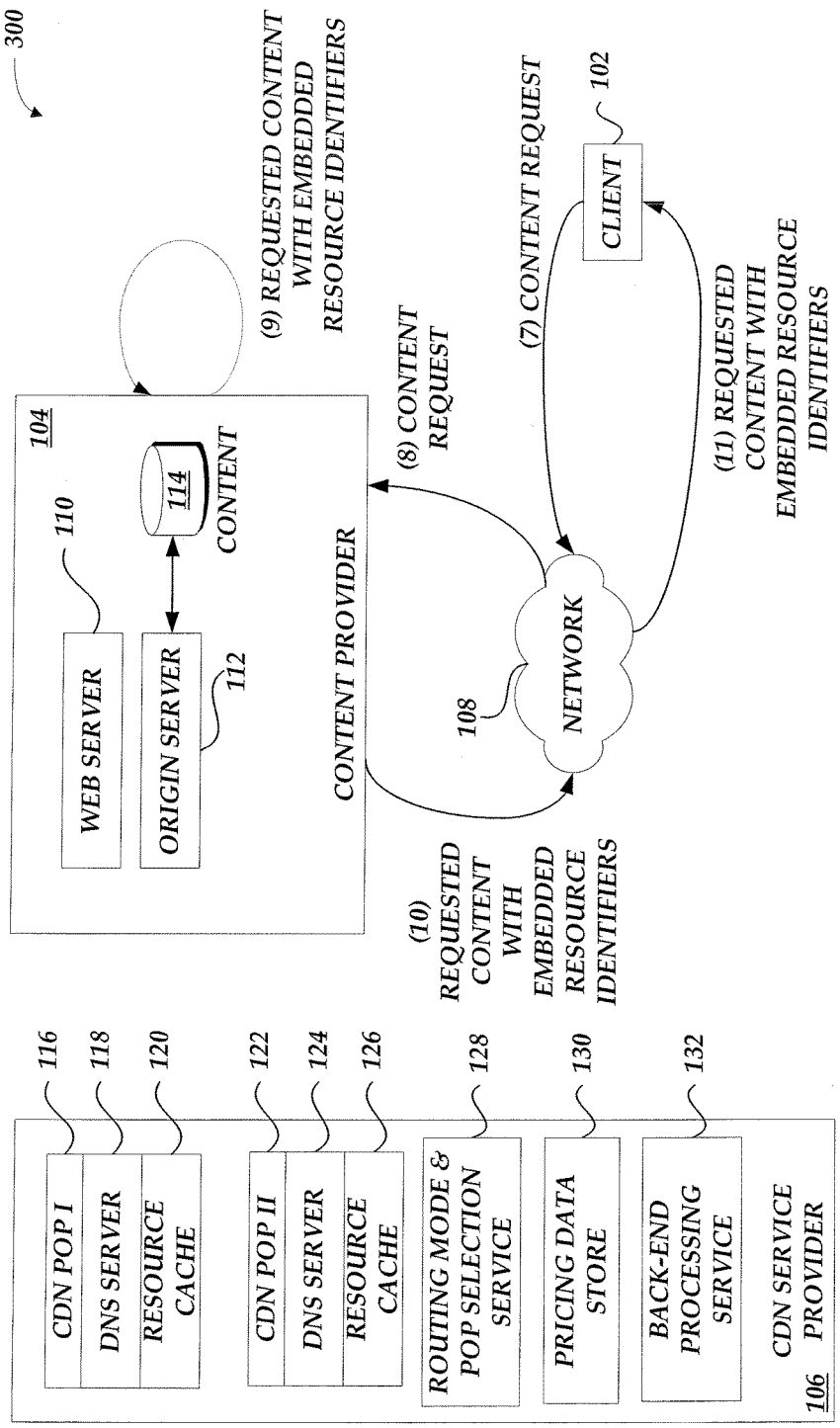
FIG. 3 is a block diagram of the content delivery environment of FIG. 1 illustrating the generation and processing of a content request from a client computing device to a content provider.

In another embodiment, the information associated with the CDN service provider 106 is included the modified URL, such as through prepending or other techniques, such that the translated URL can maintain all of the information associated with the original URL. In this embodiment, the translated URL would have the form of:

http://additional_information.cdnprovider.com/www.contentprovider.com/path/resource.xxx With reference now to FIG. 3, after completion of the registration and translation processes illustrated in FIG. 2, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers can be generally referred to as original resource identifiers or original URLs.

Upon receipt of the requested content, the client computing device 102, such as through a browser software application, begins processing any of the markup code included in the content and attempts to acquire the resources identified by the embedded resource identifiers. Accordingly, the first step in acquiring the content corresponds to the issuance, by the client computing device 102 (through its local DNS resolver), of a DNS query for the original URL resource identifier that results in the identification of a DNS server authoritative to the "." and the "com" portions of the translated URL. After resolving the "." and "com" portions of the embedded URL, the client computing device 102 then issues a DNS query for the resource URL that results in the identification of a DNS server authoritative to the ".cdnprovider" portion of the embedded URL. The issuance of DNS queries corresponding to the "." and the "com" portions of a URL are well known and have not been illustrated.

Figure 4:
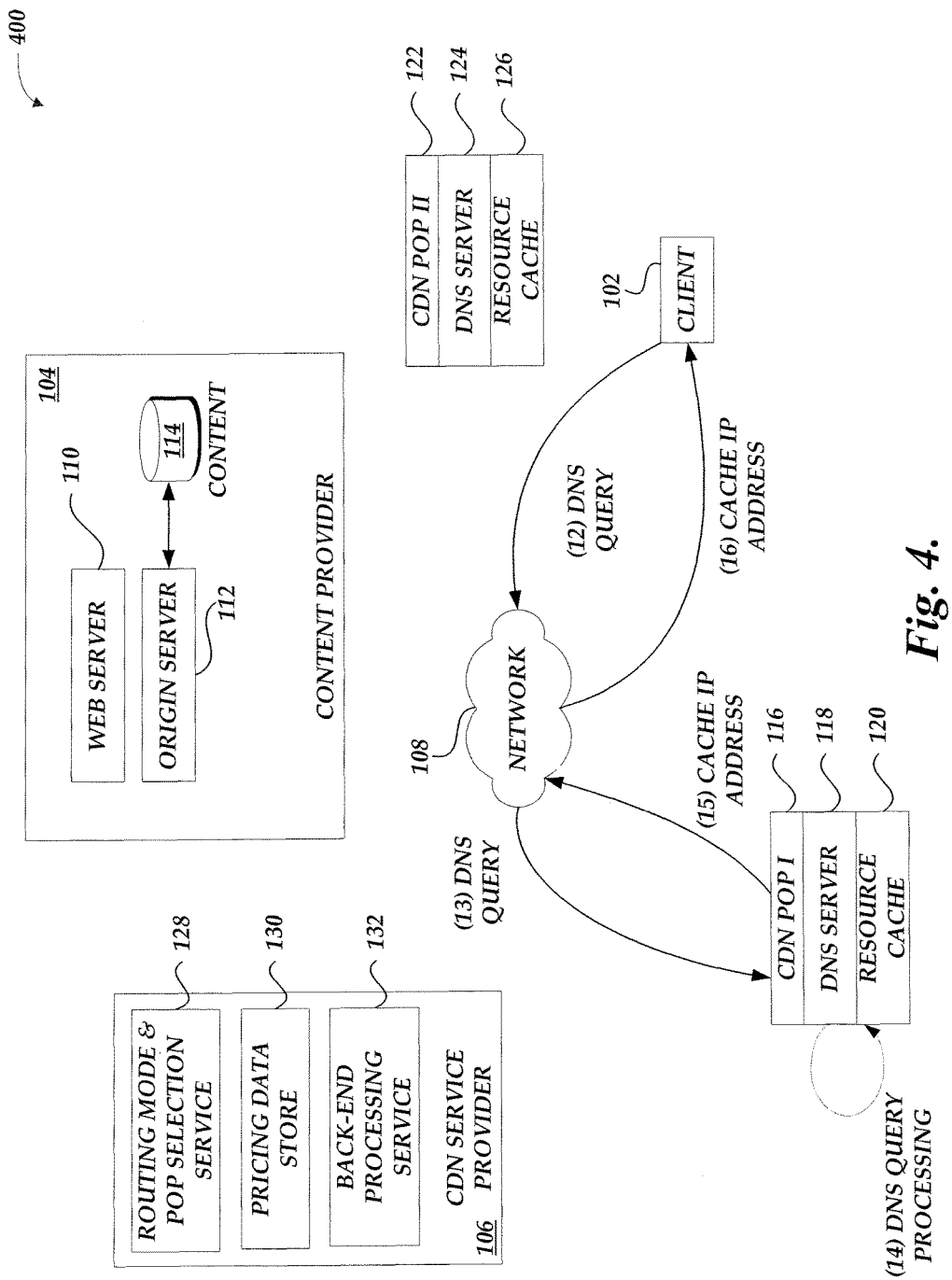
FIG. 4 is a block diagram of the content delivery environment of FIG. 1 illustrating the generation and processing of a DNS query corresponding to an embedded resource from a client computing device to a CDN service provider.

With reference now to FIG. 4, in an illustrative embodiment, after completion of the registration and translation processes illustrated in FIG. 2, the successful resolution of the "cdnprovider" portion of the original URL identifies a network address, such as an IP address, of a DNS server component 118 associated with the CDN service provider 106. In one embodiment, the IP address is a specific network address unique to a DNS server component 118 of POP 116. In another embodiment, the IP address can be shared by one or more POPs 116, 122. In this embodiment, a DNS query to the shared IP address utilizes a one-to-many network routing schema, such as anycast, such that a specific POP, POP 118, will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP.

With continued reference to FIG. 4, in either of the above-identified embodiments (or any other embodiment), a specific DNS server in the DNS component 118 of a POP 116 receives the DNS query corresponding to the original URL from the client computing device 102. Once one of the DNS servers in the DNS component 118 receives the request, the specific DNS server attempts to resolve the request. In an illustrative embodiment, a specific DNS server can resolve the DNS query by selecting an IP address of a resource cache component that will process the request for the requested resource. Alternatively, in another embodiment, as will be described further below in reference to FIGS. 5A and 5B, an alternative resource identifier (e.g., a CNAME) associated with another DNS server component of the CDN service provider 106 may be selected and returned to the client computing device 102. In either case, as will also be further described below, the CDN service provider 106, can implement various methods and systems to select a routing mode for an IP address of a cache server component of the CDN service provider 106 or an alternative resource identifier associated with another DNS server component of the CDN service provider 106, such as via the routing mode and POP selection service 128 as generally discussed above.

Returning to the embodiment of FIG. 4 specifically, the DNS server component 118 processes the DNS query in part by selecting an IP address of a resource cache component of the CDN service provider 106 based at least in part on one or more criteria. The one or more criteria can include aspects of a flat-rate pricing model offered by the CDN service provider 106 and aspects of a CDN service provider cost information. Accordingly, a threshold network usage and a threshold content delivery bandwidth can be used as one or more criteria during DNS query processing to select an IP address of the resource cache component. To evaluate these thresholds, the data links of the resource cache components 120 and 126 are associated with a throughput capability that can be measured. For example, the throughput capability of one data link at a single cache server of resource cache component 120 (or collectively as several data links at resource cache components 120 and 126) can include a measurement of the available bandwidth, used bandwidth (e.g., network usage), or other metrics that may evaluate the performance of networked components such as data links associated with resource cache components. In some instances, these measurements of bandwidth can be evaluated as a percentile (e.g., a 95th percentile metric) with reference to other data links at a specific resource cache component or several resource cache components, aggregated to use as a statistical metric. With these metrics, the DNS server component 118 then processes the DNS query in part with reference to these metrics and determines whether a sloppy routing scheme may be used if a certain metric falls above or below a certain threshold (e.g., a threshold network usage of content provider 104). Accordingly, various one or more criteria corresponding to metrics of the data links at the resource cache components 120 and 126 may be used to determine whether a sloppy routing scheme should be used.

In one embodiment of sloppy routing using the CDN service provider cost information as the one or more criteria, the routing mode and POP selection service 128 of the CDN service provider 106 can determine to route the response to a DNS query (e.g., a content request) to a different DNS server associated with an alternative resource identifier or a cache IP address that, in this example, is not the optimal service location for that DNS query. In various embodiments, the CDN service provider 106 can determine a suboptimal routing approach to avoid costs associated with data links of the resource cache components 120 and 126 servicing the content requests. In this approach, the CDN service provider 106 can provision the data links (e.g., hardware) necessary at the resource cache components 120 and 126 based on the available content delivery bandwidths of the resource cache components 120 and 126 or the DNS query processing of DNS server components 118 and 124 for servicing the requested resources. These data links, not illustratively depicted in FIG. 3, operating via network 108 cost the CDN service provider 106, in various embodiments, on a per data link basis. The costs of these data links may vary in various scenarios. In some embodiments, the cost of the data links can be determined based on the DNS query processing of the DNS server components 118 and 124 or the available content delivery bandwidth at resource cache components 120 and 126. The DNS server components 118 and 124 and resource cache components 120 and 126 can be located on edge servers at the POPs 116 and 122 located within network 108.

Figure 5A:
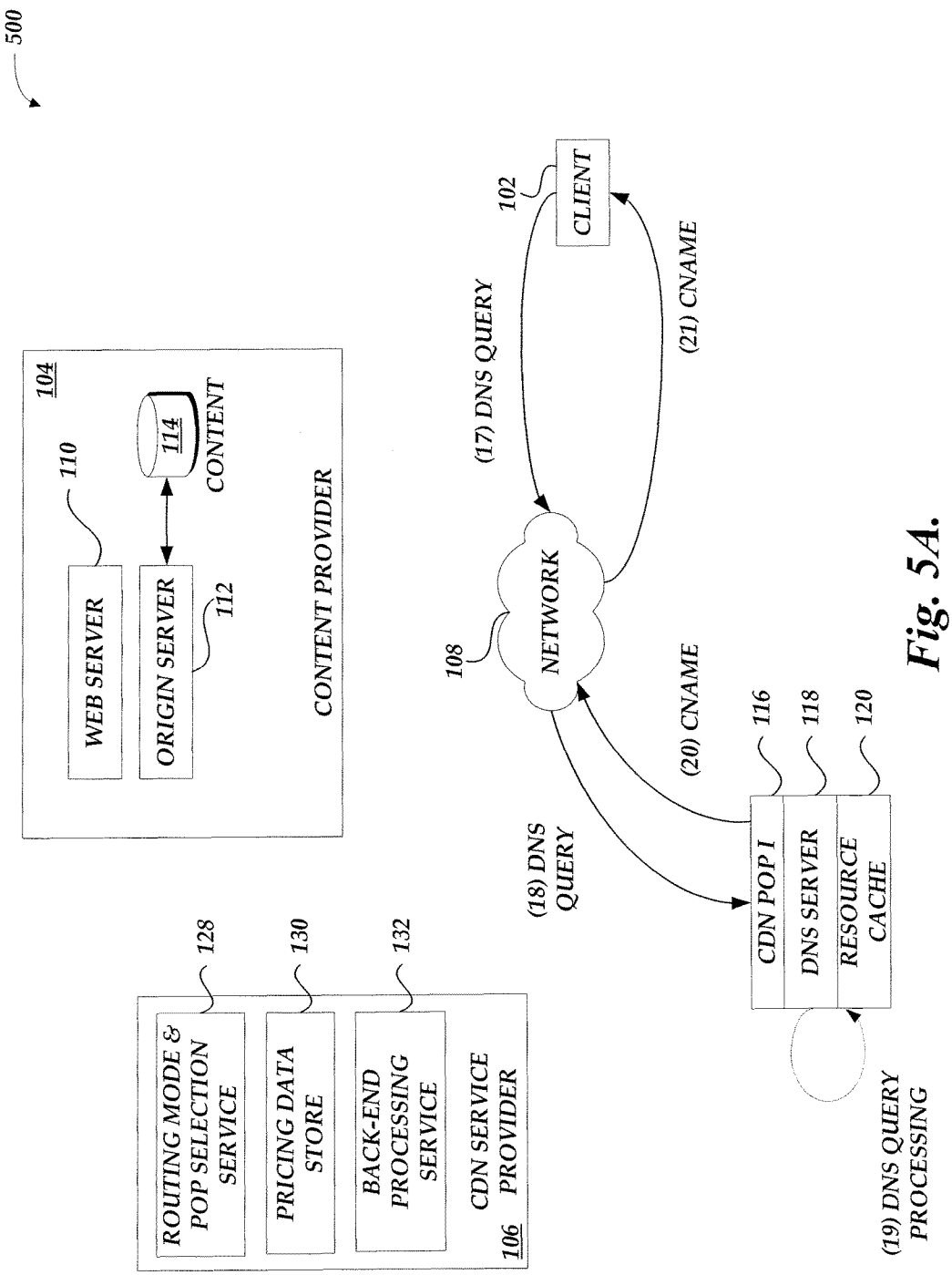
FIG. 5A is a block diagram of the content delivery environment of FIG. 1 illustrating another embodiment of the generation and processing of a DNS query corresponding to an embedded resource from a client computing device to a CDN service provider.
Figure 5B:
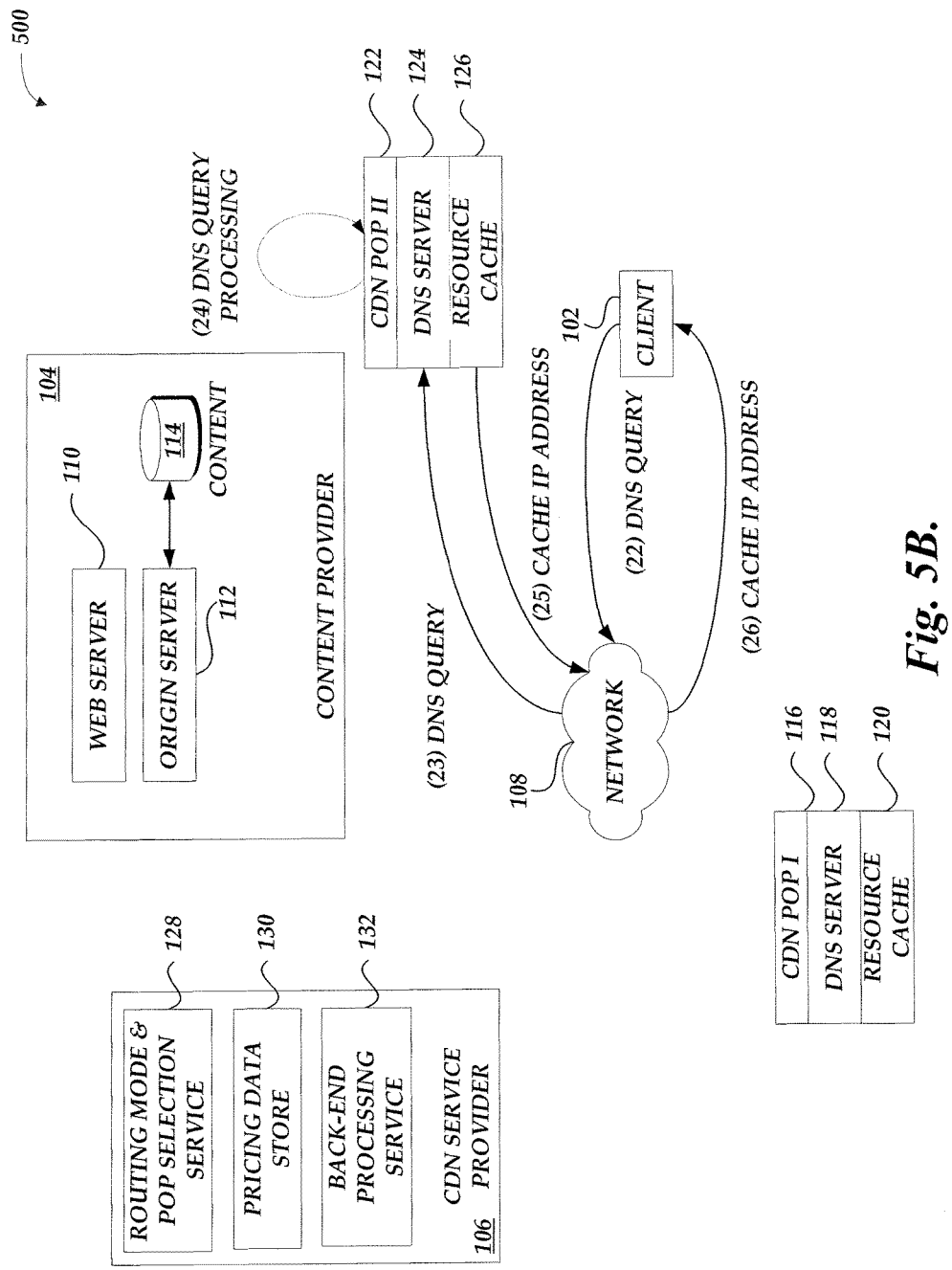
FIG. 5B is a block diagram of the content delivery environment of FIG. 1 illustrating the generation and processing of a DNS query corresponding to an alternative resource identifier from a client computing device to another POP of a CDN service provider.

More specifically, the cost of these data links at resource cache components 120 and 126 can correspond to a threshold content delivery bandwidth for a particular data link (or all of the data links). In an illustrative example, the CDN service provider 106 may incur an additional cost when a data link at the DNS server component 118 is used at a 95th percentile capacity of request handling at one or more cache servers of resource cache component 120 for a certain period of time corresponding to a time bucket. Time buckets may be used to determine the cost of operating the cache server above the threshold content delivery bandwidth. For example, a five-minute time bucket of operating above the threshold content delivery bandwidth can correspond to a certain cost; a thirty-minute time bucket, an even higher cost. If, on the other hand, the request handling at one or more cache servers of resource cache component 120 operates below that percentile, the CDN service provider 106 may incur no cost or a lesser cost. Thus the CDN service provider 106 can route various content requests to different data links of alternative cache servers (e.g., cache servers at resource cache component 126) based on the request handling capacity at cache servers of resource cache component 120 operating below or above that cost percentile. In another illustrative example, if the data link at resource cache component 120 is operating at the 98th percentile, the CDN service provider 106 can determine that another resource cache component 126, operating only at a 50th percentile, may be include alternative cache servers to handle the content requests because even this rerouted content request only raises the request handling at the cache servers of resource cache component 126 to the 55th percentile. With this rerouting approach, eventually, the overloaded 98 percentile data link at resource cache component 120 may fall below the threshold, for example, now operating at the 90th percentile. With this approach, the CDN service provider 106 has now lowered its cost operating below the threshold content delivery bandwidth at both data links of resource cache components 120 and 126. This can be referred to as a sloppy routing mode. In this continued example, the CDN service provider 106 can determine an alternative DNS server associated with an alternative resource identifier (as depicted in FIGS. 5A and 5B) or a cache IP address (as depicted in FIG. 4), both at an alternative POP, where the responses to the DNS queries can be routed. In some embodiments, the threshold content delivery bandwidth (e.g., the cost percentile at which the CDN service provider 106 incurs costs) can be stored in the pricing data store 130. The corresponding time buckets at which the CDN service provider 106 incurs costs operating above the threshold content delivery bandwidth can also be stored in the pricing data store 130. The threshold content delivery bandwidth of data links at cache servers can correspond to peak request handling for resource cache components (e.g., cache servers).

In various embodiments, the CDN service provider 106 can use the back-end processing service 132 to process stored historical data to determine whether a particular POP exceeds the threshold content delivery bandwidth during regular daily intervals, seasonally, or on a monthly basis. Back-end processing service 132 may use various methods associated with DNS query processing to track the DNS query at DNS servers or the content delivery bandwidth of data links associated with the resource cache components, located at various POPs (e.g., on edge servers) connected via the network 108.

In another illustrative example of sloppy routing, the CDN service provider 106 can determine to route the response of a DNS query (e.g., a content request) to a cache IP address that is not the optimal location for that content request because the content provider 104 has exceeded a threshold network usage. The CDN service provider 106 can determine a pricing structure for the content provider 104; for example, the content provider 104 can be charged a flat-rate price for network usage. This may allow the content provider 104 to determine that the CDN service provider 106 is cost efficient because a flat rate price is charged for network bandwidth. However with this predictability, the content service provider 106 can determine that some content providers exceed their threshold network usage that has been predicted corresponding to a determined flat-rate price. When the content provider 104 has exceeded the flat-rate price, the CDN service provider 106 can use a sloppy routing approach to reroute content requests to a suboptimal location. In some embodiments, this approach provides a balanced or reasonable latency: not the optimal latency in a default routing approach that determines the optimal cache IP address to service a DNS query, but also not the worst latency that a content provider 104 might find using an anycast routing approach. Thus the sloppy routing mode, in these embodiments, balances the latency for the content provider 104 (e.g., a customer) with the flat-rate price that the content provider 104 has paid for a corresponding network usage at that flat-rate price. In one embodiment, the content provider 104 can be on a monthly network usage plan: The content provider 104 is routed to the optimal location in the default routing approach; but, once the customer has exceeded the threshold network usage for the month, the routing mode and POP selection service 128 determines that the sloppy routing mode can be used to route a response to an alternative DNS server (which may be identified with an alternative resource identifier as depicted in FIG. 5A) or an IP address of a resource cache component at another POP location (e.g., the resource cache 126 at the second POP 122 as depicted in FIG. 3). In another embodiment, once the content provider 104 has exceeded the threshold network usage, the content provider 104 may be rerouted automatically for a specific time of day to an alternative DNS server (e.g., the DNS server 124) or an IP address of a cache component at another POP location. For example, multiple content requests for movies at 8 p.m. on Friday night can be rerouted to a suboptimal location, if that specific content provider 104 has already exceeded their threshold network usage for that month.

In various embodiments, the back-end processing service 132 can retrieve from pricing data store 130 various prices for the content provider 104 and costs of the CDN service provider 106. With this data, the back-end processing service 132 can process the tracked behavior of the network usage for the content provider 104 with various monitoring mechanisms and or approaches used by the CDN service provider 106. For example, the CDN service provider 106 may keep records of the network usage of various content providers 104 on a daily basis. In various other approaches, the CDN service provider 106 can store the pricing structure for various content providers 104 in the pricing data store 130. For example, the pricing structure can include a graduated pricing structure for a new customer (e.g., another content provider 104) or a discounted pricing structure for a loyal customer (e.g., another content provider 104). Using both the pricing data store 130 and the back-end processing service 132, the CDN service provider 106 can determine the network usage of various content providers 104.

In another illustrative example, the DNS server component 118 may use a combination of the one or more criteria to determine a sloppy routing scheme; for example, using both the threshold content delivery bandwidth and the threshold network usage for the content provider 104. Continuing in this illustrative example, the CDN service provider 106 can determine that a flat-rate price corresponds to a marginal increase in cost for a particular data link because that data link corresponds to an optimal routing approach using DNS. Thus if a content provider 104 has exceeded their monthly network usage, the CDN service provider 106 can use sloppy routing to reroute the DNS query to another POP (e.g., either via an alternative resource identifier or via a resource cache component operated by that POP) that is operating under the cost percentile for that data link, which corresponds to a threshold content delivery bandwidth. In this combined approach, the CDN service provider 106 balances the cost of provisioning subsequent data links against the latency introduced to the content provider 104 for the use of servicing DNS queries.

In an additional illustrative example of the sloppy routing mode not depicted in FIG. 4, the DNS server component 118 may keep a list of available IP addresses in the resource cache component 120 corresponding to data links that the CDN service provider 106 is operating. If a request for content of the content provider 104 is received when content provider 104 has exceeded their threshold network usage for a month, DNS server component 118 can use the list of available IP addresses with their corresponding content delivery bandwidth percentiles at that particular time. For example, the data link at the first IP address may be operating at the 98th percentile because, in this example, it is the optimal IP address, the data link at the second IP address may be operating at the 94th percentile, and the data link at the third IP address may be operating at the 57th percentile. Because, in this example, content provider 104 has exceeded their threshold network usage, the routing mode and POP selection service 128 and back-end processing service 132 can determine that the third IP address can be used to service a DNS query; thereby minimizing the cost to operate the data links of CDN service provider 106. This avoids using the second IP address when a marginal increase in DNS queries could push the data link at the second IP address to operate over the threshold content delivery bandwidth (e.g., the 95th percentile). Additionally, some traffic on the data link at the second IP address can be routed to the third IP address if CDN service provider 106 determines that the incremental latency experienced is minimal or if the another content provider 104 operating their content requests on the data link at the second IP address suddenly exceeds their threshold network usage for the month.

Further in various sloppy routing schemes using a combination of the one or more criteria, the CDN service provider 106 can determine various permutations of the sloppy routing mode based on information regarding the pricing structure of a content provider 104 stored in the pricing data store 130. In the same continued example from above, the latency incurred by a flat-rate price on the data link at the third IP address may be a greater cost in terms of latency for the content provider 104 when compared to the marginal cost incurred by the CDN service provider 106 when servicing that DNS query on the data link at the second IP address, which would have resulted in exceeding the threshold content delivery bandwidth for the CDN service provider 106. Thus the routing mode and POPs selection service 128 can include a determination that balances the latency for the content provider 104 operating above a threshold network usage with the cost incurred by operating a data link above the content delivery bandwidth threshold. With this approach in view, various embodiments are possible balancing the latency incurred for the content provider 104 for a particular cost incurred by CDN service provider 106. Thus CDN service provider 106 can use a pricing structure stored in pricing data store 130 for content provider 104 that is based primarily on the latency that content provider 104 is willing to incur.

Further still, this latency criterion can be related to the use case of the content request for that the content provider 104. For example, CDN service provider 106 can have a pricing structure for content provider 104 that charges more for HD video than for public information or text-based file formats. In some instances, as one of skill in the art can appreciate, HD video may incur greater latency than files with text-based formats or emails.

In various embodiments, as one of skill in the art can appreciate, data can be collected by CDN service provider 106 regarding the content requests of the content provider 104 according to time of day, or month, or based on certain content requests. This data can be processed in the back-end processing service 132. All of these factors can be used as the one or more criteria to determine a sloppy routing approach for the response of a particular DNS query. Various factors can be processed by back-end processing service 132 as will now be described herein. For example, in various embodiments, latency may not be the criterion to be optimized for sloppy routing, but instead, content accessibility for the content provider 104 may be the criterion.

In this sloppy routing approach using content accessibility as one of the one or more criteria, the CDN service provider 106 can additionally use hashing algorithms to determine a POP location with the lowest latency to service a particular DNS query. With hashing algorithms, the CDN the service provider 106 can use the routing mode and POP and selection service 128 to divide a certain number of POP into stripes to be used in computing likelihoods of content availability. Then, a hashing algorithm can use the name of the content provider 104 with the DNS query to determine the likelihood that content is stored for that content provider 104 at a particular POP that would service the resource request with the lowest latency. In this approach, content requests are more likely to be serviced with less latency by using that POP having a higher likelihood of content stored at the resource cache component of that POP than others. In some embodiments, if the content provider 104 includes several requests for the same content, feedback can be used to indicate that any of the POPs may have an equal likelihood of having the content stored and thus offer nearly equivalent low latencies.

Additional criteria can be used by routing mode and POP selection service 128 during DNS query processing to determine which POP locations or IP addresses to sloppy route for the response of a particular DNS query.

Another one or more criteria of sloppy routing include determining POP locations that can enhance security. In this approach, routing mode and POP selection service 128 can determine that the second POP 122 is less secure so that the list of available IP addresses at the resource cache component 120 no longer includes cache IP addresses associated with the second POP 122 or moves the cache IP addresses associated with the second POP 122 to the bottom of the list for servicing DNS queries. More specifically, routing mode and POP selection service 128 can use information that CDN service provider 106 receives from a look-up table of IP addresses that have security concerns. With this look-up table of IP addresses, routing mode and POP selection service 128 can compare that list with the list available of cache IP address for sloppy routing at DNS server component 118 to determine whether a particular IP address should be avoided for the content provider 104 that has an increased security concerns (e.g., an increased susceptibility factor). In some embodiments, this may be additionally addressed by changing the routing mode. For example, the routing mode at routing mode and POP selection service 128 can be changed to a regional anycast routing mode or anycast routing mode for enhanced security. In some embodiments, CDN service provider 106 can financially charge the content provider 104 more to provide this enhanced security, especially if the content provider 104 requests secure connection for content requests (e.g., because content provider 104 is servicing DNS queries that include secure or financial transactions).

Another one or more criteria of sloppy routing include using a favored or biased approach for a particular content provider 104: the CDN service provider 106 can determine that a certain content provider 104 is favored because it has been a customer of CDN service provider 106 for a long period of time (or pays CDN service provider 106 more than other content providers). In one embodiment then, even though this favored or loyal customer has exceeded their threshold network usage, the routing mode and POP selection service 128 can determine that that content provider 104 is not sloppy routed, but, instead, content provider is provided the optimal IP address at DNS server 118. In contrast, this favored approach may also be used for new customers. For example, a new customer that has only exceeded their threshold at work usage on day 20 of the month could still be provided the optimal IP address if the CDN service provider 106 determines that the marginal cost of servicing new customers with a lower latency, even though it incurs a greater cost for the data link, is less than the likelihood that that new customer may drop coverage or choose another CDN service provider.

With this description, as one of skill in the art can appreciate, various approaches are possible to favor certain content provider 104 over another based on preferences determined and processed by back-end processing service 132. In some embodiments this may include using historical data to analyze content provider 104 behavior based on: latency, price, security concerns, content accessibility, whether a content provider 104 is primarily downloading bulk data, whether a particular POP is a peer of CDN service provider 106 network, or any other relevant factors that affect servicing a particular DNS query. Further, a combination of factors may be used to determine the alternative resource identifier associated with another POP location or cache IP address to be used when routing a DNS query. For example, CDN service provider 106 may determine that latency and susceptibility factors should be the only factors to be used when selecting a cache IP address from the list of available addresses at DNS server 118.

With further reference to FIG. 4, upon selection of a specific cache server computing device (or a resource cache component 120, 126), the DNS server component 118 provides an IP address of the cache server computing device, resource cache component, or load balancer/load share device associated with a resource cache component. As will be described further below in reference to FIG. 6, the client computing device 102 can then utilize Internet communication protocols to request the resource from a specific cache server computing device identified by the IP address. The cache server computing device then processes the request, as will also be described in greater detail below, to provide the resource to the client computing device 102.

With reference now to FIG. 5A, in another embodiment, after completion of the registration and translation processes illustrated in FIG. 2, a specific DNS server in the DNS server component 118 of the POP 116 receives the DNS query corresponding to the original URL from the client computing device 102. Once one of the DNS servers in the DNS server component 118 receives the request, the specific DNS server attempts to resolve the request. In one illustrative embodiment, as described above and shown in reference to FIG. 4, a specific DNS server resolves the DNS query by identifying an IP address of a cache server component that will process the request for the requested resource. As described above and as will be described further below in reference to FIG. 6, a selected resource cache component can process the request by either providing the requested resource if it is available or attempt to obtain the requested resource from another source, such as a peer cache server computing device or the origin server 112 of the content provider 104.

Returning to FIG. 5A, as an alternative to selecting a resource cache component upon receipt of a DNS query as described in reference to FIG. 4, the CDN service provider 106 can process the DNS query to select another POP for further processing a subsequent DNS query associated with the originally requested resource. The selection of another POP can also be based, at least in part, on the same one or more criteria detailed above with respect the selection of a resource cache component in FIG. 4. In this embodiment, the CDN service provider 106 can maintain sets of various alternative resource identifiers. The alternative resource identifiers can be provided by the CDN service provider 106 to the client computing device 102 such that a subsequent DNS query on the alternative resource identifier will be processed by a different DNS server component within the CDN service provider's network. In an illustrative embodiment, the alternative resource identifiers are in the form of one or more canonical name ("CNAME") records. In one embodiment, each CNAME record identifies a domain of the CDN service provider 106 (e.g., "cdnprovider.com" or "cdnprovider-1.com"). As will be explained in greater detail below, the domain in the CNAME does not need to be the same domain found in original URL or in a previous CNAME record. Additionally, each CNAME record includes additional information, such as request routing information, (e.g., "request routing information"). An illustrative CNAME record can have the form of:

http://request_routing_information.cdnprovider.com/
path/resource.xxx

CNAME request_routing_information.cdnprovider.com

In an illustrative embodiment, the CNAME records are generated and provided by the DNS servers to direct a more appropriate DNS server of the CDN service provider 106. As used in accordance with the present disclosure, appropriateness can be defined in any manner by the CDN service provider 106 for a variety of purposes. In an illustrative embodiment, as will be described in greater detail below in reference to FIG. 7, in addition to the one or more criteria noted above, the CDN service provider 106 can utilize domain information associated with the content provider 104, at least in part, to identify the more appropriate DNS server of the CDN service provider 106. In particular, the CDN service provider 106 can use the domain information in the DNS query to identify the content provider 104, and in turn, identify a current and threshold network usage for the identified content provider 104. As noted above, the threshold network usage for a content provider can be determined based, at least in part, on pricing information for the CDN service provider to provide content on behalf of the content provider 104. Specifically, as one example, a content provider may pay a flat fee for unlimited network usage of the CDN service provider's network. However, the CDN service provider 106 may manage its resources by determining a threshold network usage for the content provider based on its flat fee at or below which the CDN service provider 106 will process requests at an optimal POP or route requests to an optimal POP. Alternatively, if the current network usage for servicing domains corresponding to the content provider 104 is above the threshold network usage, the CDN service provider 106 can select a less optimal POP to process the request.

In another embodiment, building on the foregoing example, the CDN service provider 106 can utilize client location information associated with the client computing device 102 or its local DNS resolver, at least in part, to identify the more appropriate DNS server of the CDN service provider 106. In particular, the CDN service provider 106 can utilize an IP address associated with a client computing device DNS query to identify a best sub-optimal POP to process the request. Based on the client location information, the CDN service provider 106 can then select a POP 116, 122 from a set of sub-optimal POPs that are identified as being available to service resource requests under the circumstances. In one example, if more than one POP is identified in the set of sub-optimal POPs, the CDN service provider 106 can utilize a distribution allocation for selecting a specific POP associated with the client location information. In another example, once a POP is selected, the CDN service provider 106 can further use health information to determine whether the selected POP is available to service requests before providing the client computing device with a CNAME corresponding to the selected POP. This health information may in one embodiment correspond to a threshold content delivery bandwidth available at the POP as also described above. One skilled in the art will appreciate that the above functionality is illustrative in nature and accordingly should not be construed as limiting.

As described above, in addition to the consideration of client location information (either of the end-client or its associated local DNS resolver component), the CDN service provider 106 can utilize the additional information (e.g., the "additional information") included in the translated URL to select a more appropriate DNS server. In one aspect, the CDN service provider 106 can utilize the additional information to select from a set of DNS servers identified as satisfying criteria associated with the client location information or from a set of DNS services identified as satisfying any other criterion or combination of criteria, such as those described in other example embodiments herein. In another aspect, the CDN service provider 106 can utilize the additional information to validate the DNS server selected in accordance with the client location information or to select an alternative DNS server previously selected in accordance with the client location information. In one example, the CDN service provider 106 can attempt to direct a DNS query to DNS servers according to additional geographic criteria. The additional geographic criteria can correspond to geographic-based regional service plans contracted between the CDN service-provider 106 and the content provider 104 in which various CDN service provider 106 POPs are grouped into geographic regions. Accordingly, a client computing device 102 DNS query received in a region not corresponding to the content provider's regional plan may be better processed by a DNS server in region corresponding to the content provider's regional plan. In another example, the CDN service provider 106 can attempt to direct a DNS query to DNS servers according to service level criteria. The service level criteria can correspond to service or performance metrics contracted between the CDN service provider 106 and the content provider 104. Examples of performance metrics can include latencies of data transmission between the CDN service provider POPs and the client computing devices 102, total data provided on behalf of the content provider 104 by the CDN service provider POPs, error rates for data transmissions, and the like.

In still a further example, the CDN service provider 106 can attempt to direct a DNS query to DNS servers according to network performance criteria. The network performance criteria can correspond to measurements of network performance for transmitting data from the CDN service provider POPs to the client computing device 102. Examples of network performance metrics can include network data transfer latencies (measured by the client computing device or the CDN service provider 106, network data error rates, and the like).

In accordance with an illustrative embodiment, the DNS server maintains a data store that defines CNAME records for various original URLs. If a DNS query corresponding to a particular original URL matches an entry in the data store, the DNS server component 118 returns a CNAME record as defined in the data store. In an illustrative embodiment, the data store can include multiple CNAME records corresponding to a particular original URL. The multiple CNAME records would define a set of potential candidates that can be returned to the client computing device 102. In such an embodiment, the DNS server component 118, either directly or via a network-based service, can implement additional logic in selecting an appropriate CNAME from a set of possible of CNAMEs. In an illustrative embodiment, each DNS server component 118, 124 maintains the same data stores that define CNAME records, which can be managed centrally by the CDN service provider 106. Alternatively, each DNS server component 118 and 124 can have POP specific data stores that define CNAME records, which can be managed centrally by the CDN service provider 106 or locally at the POP 116, 122.

Returning to FIG. 5A, one skilled in the relevant art will appreciate that DNS server component 118 may select (or otherwise obtain) a CNAME record that is intended resolve to a more appropriate DNS server of the CDN service provider 106 based one or more criteria, as described above. Then, the CDN service provider 106 returns the CNAME record to the client computing device 102.

With reference now to FIG. 5B, upon receipt of the CNAME from the DNS server component 118, the client computing device 102 generates a subsequent DNS query corresponding to the CNAME. As previously discussed with regard to FIG. 5A, the DNS query process could first start with DNS queries for the "." and "com" portions, followed by a query for the "cdnprovider" portion of the CNAME. To the extent, however, that the results of a previous DNS queries can be cached (and remain valid), the client computing device 102 can utilize the cached information and does not need to repeat the entire process. However, at some point, depending on whether the CNAME provided by DNS server component 118 (FIG. 5A) and the previous URL or CNAME share common CDN service provider domains, the current CNAME DNS query will be processed by a different POP provided by the CDN service provider 106. As illustrated in FIG. 5B, the DNS server component 124 of POP 122 receives the current CNAME based on the different information in the current CNAME previously provided by the DNS server component 118. As previously described, the DNS server component 124 can then determine whether to resolve the DNS query on the CNAME with an IP address of a cache component that will process the content request or whether to provide another alternative resource identifier selected in the manners described above.

For purposes of illustration, assume that the DNS server component 124 processes the content request by returning an IP address of a resource cache component. In an illustrative embodiment, the DNS server component 124 can utilize a variety of information in selecting a resource cache component. In one example, the DNS server component 124 can default to a selection of a resource cache component of the same POP. In another example, the DNS server components can select a resource cache component based on various load balancing or load sharing algorithms. Still further, the DNS server components can utilize network performance metrics or measurements to assign specific resource cache components. The IP address selected by a DNS server component may correspond to a specific caching server in the resource cache. Alternatively, the IP address can correspond to a hardware/software selection component (such as a load balancer).

Figure 6:
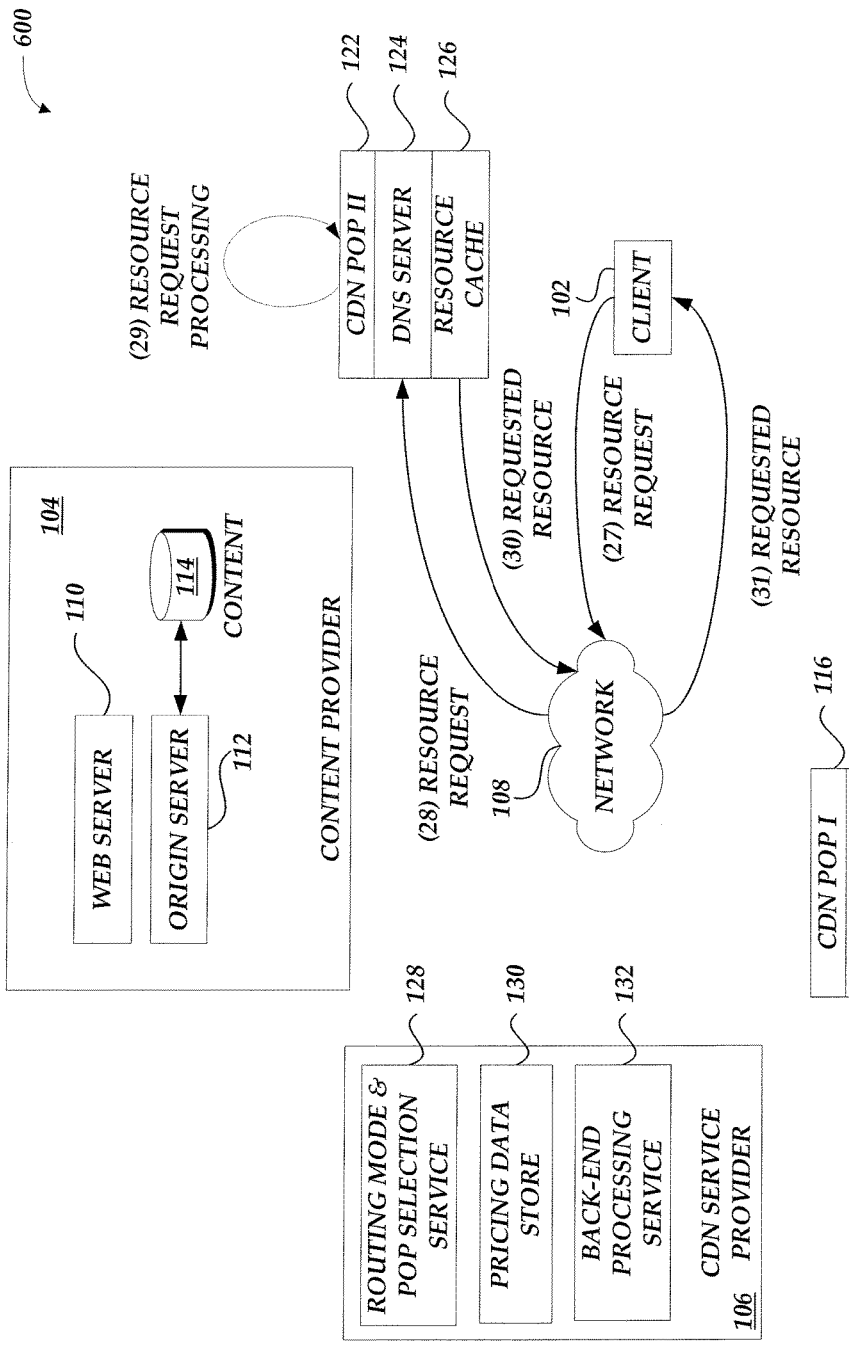
FIG. 6 is a block diagram of the content delivery environment of FIG. 1 illustrating the generation and processing of embedded resource requests from a client computing device to a CDN service provider.

With reference now to FIG. 6, continuing with an illustrative embodiment corresponding to FIGS. 5A and 5B, assume that the DNS server component 124 shown in FIG. 5B has selected the default resource cache component 126 of the POP 122. Upon receipt of the IP address for the resource cache component 126, the client computing device 102 transmits, as shown in FIG. 6, a request for the requested content to the resource cache component 126. The resource cache component 126 processes the request in a manner described above and the requested content is transmitted to the client computing device 102.

Alternatively, in another embodiment corresponding to FIG. 4, assume that the DNS server component 118 has selected a specific resource cache component of another POP, such as POP 122 based on the one or more criteria as described above. Upon receipt of the IP address for the resource cache component 126 of the POP 122, the client computing device 102 transmits, as shown in FIG. 6, a request for the requested content to the resource cache component 126. The resource cache component 126 processes the request in a manner described above and the requested content is transmitted to the client computing device 102.

A selected resource cache component (either selected directly by a POP receiving a DNS query as shown in FIG. 4 or as a default upon selection of an alternative POP via an alternative resource identifier as shown in FIGS. 5A and 5B) can process the request by either providing the requested resource if it is available or obtaining the requested resource from another source, such as a peer cache server computing device or the origin server 112 of the content provider 104.

Figure 7:
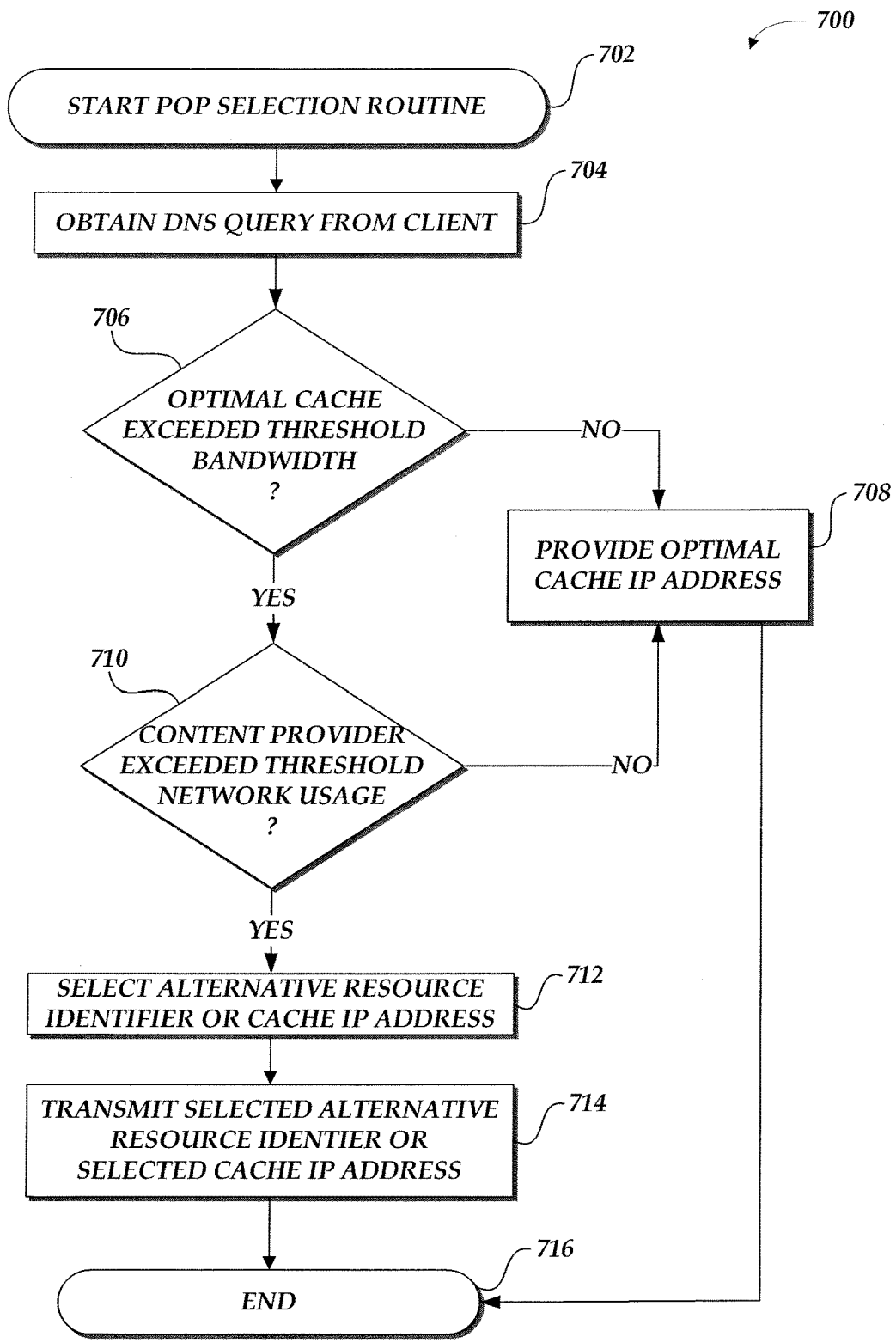
FIG. 7 is a flow diagram illustrative of a POP selection routine implemented by a CDN service provider.

With reference now to FIG. 7, one embodiment of a POP selection routine 702 implemented by the CDN provider 106 will be described. One skilled in the relevant art will appreciate that actions/steps outlined for routine 702 may be implemented by one or many computing devices/components that are associated with the CDN service provider 106. Accordingly, routine 702 has been logically associated as being generally performed by the CDN service provider 106, and thus the following illustrative embodiments should not be construed as limiting.

At block 704, a DNS server component 118 at a first POP 116 of the CDN service provider 106 receives a DNS query corresponding to a resource identifier from a client computing device 102. As previously discussed, the resource identifier can be a URL that has been embedded in content requested by the client computing device 102 and previously provided by the content provider 104. Alternatively, the resource identifier can also correspond to a CNAME provided by a content provider DNS server in response to a DNS query previously received from the client computing device 102. While not illustrated, the receiving DNS server also obtains, in some embodiments, an IP address associated with the DNS query from the requesting client computing device 102 ("query IP address"). The query IP address can correspond to an IP address of the client computing device or any local DNS resolver component associated with the client computing device.

Next, at decision block 706, the CDN service provider 106 determines whether it has exceeded a threshold content delivery bandwidth at the first POP. As discussed above, the threshold content delivery bandwidth is determined based, at least in part, on CDN service provider cost information, which corresponds to a financial cost to the CDN service provider 106 for content delivery bandwidth. In particular, in one embodiment, assuming that the first POP, or more specifically the DNS server component at the first POP, receiving the DNS query is the optimal POP or DNS server component for processing the DNS query, this determination at block 706 corresponds to a determination of whether the resource cache component at the POP receiving the DNS query (which can correspond to either a single cache server or a bank of cache servers at the POP) is operating above a threshold content delivery bandwidth. Continuing with this embodiment, the resource cache component at the first POP can also be referred to as the default or optimal resource cache component. In a further illustrative embodiment, the threshold content delivery bandwidth is lower than a maximum available content delivery bandwidth for the first POP or resource cache component.

If the first POP or resource cache component has not exceeded its threshold content delivery bandwidth, the CDN service provider 106 responsively provides the client computing device 102 with an IP address of the default or optimal resource cache component at the first POP at block 708. Thereafter, at block 716, routine 702 ends. Alternatively, if at decision block 706, the first POP or resource cache component has exceeded its threshold content delivery bandwidth (which may be indicative, for example, of the CDN service provider 106 incurring additional financial costs to provide the requested content from the first POP or its default resource cache component), the CDN service provider 106 determines whether a content provider corresponding to a domain associated with the DNS query has exceeded a threshold network usage at block 710.

If the content provider has not exceeded its threshold network usage, the CDN service provider 106 responsively provides the client computing device 102 with an IP address of the default or optimal resource cache component of the first POP at block 710. Thereafter, at block 716, routine 702 ends. Alternatively, if at decision block 710, the content provider has exceeded its threshold network usage (which may be indicative, for example, of the CDN service provider incurring the burden of additional financial costs above a pricing structure, such as a flat fee structure, offered to the content provider), processing continues at block 712. As described above, in an illustrative embodiment, the threshold network usage is determined based, at least in part, on pricing information for the CDN provider to provide content on behalf of the content provider.

While the routine 702 illustrates making both determinations at blocks 706 and 710, in another embodiment, the determination at block 706 may be optional, while in a yet further alternative embodiment, the determination at block 710 may be optional.

Continuing at block 712, if either or both of the determinations at blocks 706 and 710 result in a "YES" determination, the CDN service provider 106 selects an alternative resource identifier associated with an alternative POP of the CDN service provider 106 or an alternative cache IP address associated with an alternative POP. In particular, in one illustrative embodiment, where an alternative resource identifier is selected, the CDN service provider 106 more specifically selects an alternative resource identifier that would resolve to a particular alternative DNS server at the alternative POP. In another illustrative embodiment, where an alternative cache IP address is selected, the CDN service provider 106 may select an alternative cache IP address for a particular cache server of a resource cache component at the alternative POP or generally for a group of cache servers at the alternative POP. In this way, the CDN service provider 106 directs further processing of the request to an alternative POP of the CDN service provider.

Next, at block 714, the selected alternative resource identifier or alternative cache IP address is transmitted to the client in response to the obtained DNS query for further processing. Thereafter, at block 716, routine 702 ends. In various embodiments, routine 702 may be performed by the CDN service provider 106 generally, or by DNS server components 118, 124 or individual DNS servers associated with the DNS server components 118,124. The CDN service provider 106, DNS server components 118, 124, or individual DNS servers associated with the DNS server component 118, 124 may themselves include or otherwise access a service to implement the routine 702, such as the routing mode and POP selection service 128 of FIG. 1. In other embodiments, a physical computing device with computer executable instructions may cause the computing device to perform routine 702. In some embodiments of the routine 702, elements may occur in sequences other than as described above. In addition, as noted above, some elements of the routine may be optional, such as the determinations at either block 706 or 710. One skilled in the art will appreciate that additional variations are possible and within the scope of the present disclosure.

Figure 8:
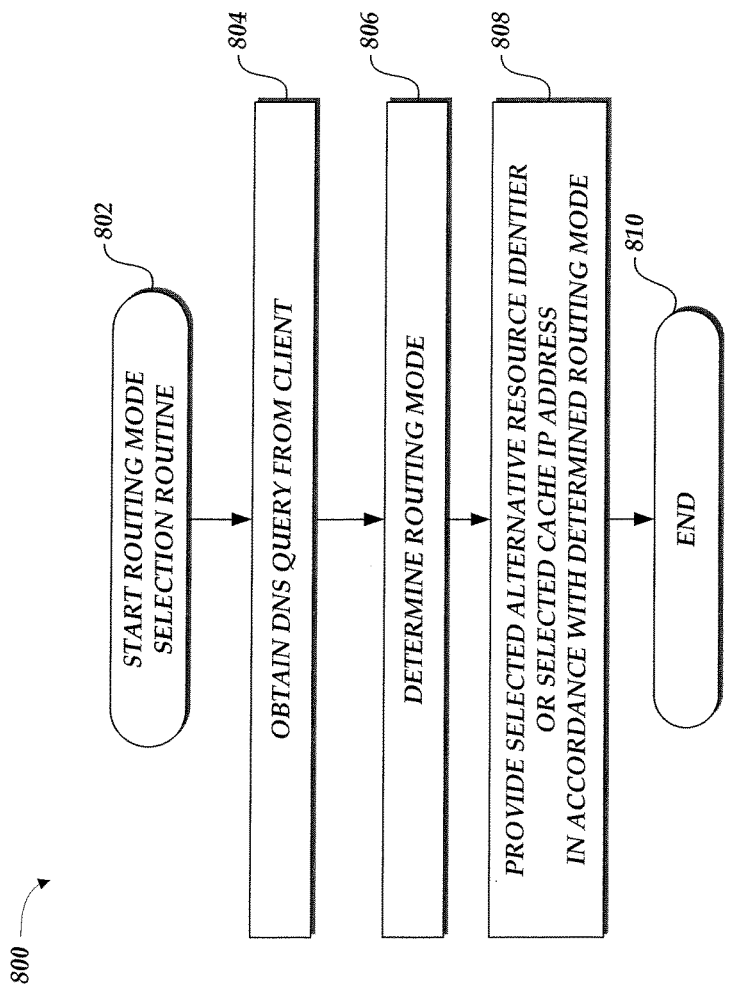
FIG. 8 is a flow diagram illustrative of a routing mode selection routine implemented by a CDN service provider.

With reference now to FIG. 8, one embodiment of a routing mode selection routine 802 will be described. One skilled in the relevant art will appreciate that actions/steps outlined for routine 802 may be implemented by one or many computing devices/components that are associated with the CDN service provider 106. Accordingly, routine 802 has been logically associated as being generally performed by the CDN service provider 106, and thus the following illustrative embodiments should not be construed as limiting.

At block 804, a DNS server component 118 at a first POP 116 of the CDN service provider 106 receives a DNS query corresponding to a resource identifier from a client computing device 102. As previously discussed, the resource identifier can be a URL that has been embedded in content requested by the client computing device 102 and previously provided by the content provider 104. Alternatively, the resource identifier can also correspond to a CNAME provided by a content provider DNS server in response to a DNS query previously received from the client computing device 102. While not illustrated, the receiving DNS server also obtains, in some embodiments, an IP address associated with the DNS query from the requesting client computing device 102 ("query IP address"). The query IP address can correspond to an IP address of the client computing device or any local DNS resolver component associated with the client computing device.

Next, at block 806, the CDN service provider 106 responsively determines a routing mode for the response to the DNS query obtained at block 804. In some embodiments, this determination can be made during DNS query processing as described above with reference to FIGS. 4-5B. In various embodiments, a spectrum of routing modes can exist that the CDN service provider 106 may determine during DNS query processing (e.g., at the DNS server when the DNS query is obtained). A plurality of available routing modes can include: a default routing mode, a sloppy routing mode, a regional anycast routing mode, and an anycast routing mode. The one or more criteria used in DNS query processing can be used to determine the routing mode for providing the requested resource. Accordingly, the response to the DNS query can be transmitted and/or provided to the client 102 in accordance with the determined routing mode.

With continuing reference to block 806, the CDN service provider can determine an appropriate routing mode for providing the requested resource. As discussed previously with reference to FIG. 4 and in accordance with the present disclosure, appropriateness can be defined in any manner by the CDN service provider 106 for a variety of purposes. Illustratively, the one or more criteria used to determine the routing mode can include a susceptibility factor (also referred to as security factor) and the latency criteria discussed above with reference to FIG. 4. In various embodiments, the determination of an appropriate routing mode from a spectrum of routing modes can be based at least in part on a tradeoff between a susceptibility factor of a routing mode and the latency for providing the requested resource with the routing mode. For example, in one embodiment, the default routing mode can be determined as the appropriate routing mode. The determination of the optimal cache server may be a default based on the DNS query already being routed to the optimal POP and received at the DNS server component 118. The DNS server component 118, then, simply provides an IP address of an associated cache server at that POP. Alternatively, the DNS server component, upon receiving the DNS query, may be associated with a cache server component, and then selects from one of the cache servers of resource cache component 120 that may be the logically closest. Accordingly, in various embodiments, the default routing mode can also be referred to as a latency-based routing mode (e.g., a routing mode that provides an optimal cache server, minimizing latency when providing the requested resource). Still further, in another embodiment, this latency-based routing mode can be referred to as a minimal latency-based routing mode that minimizes the latency when providing the requested resources on behalf of the content provider 104. As one of skill in the art can appreciate, these examples illustrate how the default routing mode can offer an optimal cache server at the POP location receiving the DNS query or route the response to a DNS query using a cache IP address associated with an optimal cache server. While this optimal cache server minimizes latency, this default routing mode may, however, provide less security. But, at the same time, this default routing mode may provide less security because a single specific cache server is typically the optimal cache server and thus may have a higher susceptibility factor given those security concerns. For example, in one embodiment, because the optimal cache server is associated with a pre-specified IP address, the specific IP address could be leaked or easily discernible to outside parties, which raises the security concerns associated with that optimal cache server.

In contrast, the anycast routing mode uses a selected anycast IP address (e.g., a cache IP address or destination IP address) to process resource requests. An anycast IP address (e.g., a global IP address that may be randomly assigned to available cache servers) can be associated or shared by several cache servers that can provide the requested resource. Because several cache servers can service the requested resource, the susceptibility factor of the anycast routing mode is lower than the default routing mode. For example, by providing a DNS server component at the CDN service provider with an option to determine an appropriate routing mode in which to respond to a DNS query, the DNS server component may select the anycast routing mode to provide enhanced security, as compared to the default routing mode. Such a determination offers enhanced security because an original cache server that would service the resource request in a default routing mode can be quickly changed to a secondary cache server (e.g., another cache server) associated with a shared anycast IP address (e.g., a randomly assigned global IP address), if a security concern is discovered to be associated with the POP or DNS server component receiving the DNS query, and hence the original default cache server corresponding to that POP. But, at the same time, such a secondary cache server can be more geographically distant (e.g., traveling through intercontinental optical cables) from the client 102, and thus incurring a higher latency, especially when compared with the default routing mode that uses the optimal cache server. In one embodiment, the anycast routing mode, as discussed herein, may correspond to traditional anycast routing as known to those of skill in the art.

In another embodiment of determining the appropriate routing mode at block 806, a content provider can be assigned a susceptibility factor that relates to the security concerns of each available routing mode. For example, a content provider 104 (e.g., a customer of the CDN service provider 106) that has its content typically served by the CDN service provider 106 in a geographical location (e.g., region with less security) can have an increased susceptibility factor in a default routing mode. Instead, the anycast routing mode can be determined as the appropriate routing mode to offer enhanced security as an anycast IP address is associated with several cache servers viaa randomly assigned global IP address. Thus, in contrast to a specific optimal cache server associated with a pre-specified IP address that may be leaked, there are many available cache servers in the anycast routing mode for providing responsive content which are not individually designated and hence specifically targeted. Accordingly, the susceptibility factors may bias the determination of the appropriate routing mode in favor of the anycast routing mode because the anycast routing mode can provide enhanced security. In contrast, a default cache IP address stored at a DNS server may be more easily discernible as it is individually pre-designated.

In another example, a regional anycast routing mode can be determined as the appropriate routing mode, at block 806. In some embodiments, the CDN service provider 106 may consider the security factor like the anycast routing mode, but additionally consider the latency factor. This can be undertaken when the one or more criteria indicate that a susceptibility factor is to be associated with the plurality of available routing modes, but also the latency factor associated with the plurality of available routing modes. Continuing in this example, the regional anycast routing mode can be used to route the response to the DNS query so that several cache servers are available with a regional IP address (e.g., a regional IP address can be randomly assigned and associated with several cache servers in a region) used to service the request, thereby enhancing security. This determination can be made dynamically at the DNS server component 118 or it can have been considered by a central computing component of the CDN service provider 106, which, in turn, provides a list of available cache servers from which the DNS server component 118 can select from. Thus, the one or more criteria can in part dictate, or de facto, determine a routing mode for providing the requested resource.

In another example, a particular DNS resolver may service a diverse set of client computing devices 102, such as clients that are located in multiple different geographic regions. Such a resolver is hereinafter referred to as a diverse DNS resolver. In this example, since the clients are geographically diverse, some clients' resource requests may experience more latency than others being serviced by the same DNS resolver. With this information, the CDN service provider 106 may determine that a regional anycast routing mode may be the appropriate routing mode for providing the requested resource at block 806. The regional anycast routing mode corresponds to a modified version of an anycast routing mode which utilizes a one-to-many network routing schema, but in this instance the one-to-many network routing schema is limited by region, such as a geographic region. In particular, a regional one-to-many network routing schema provides that a specific POP, DNS server component 118, or resource cache component in a particular region will receive the request as a function of network topology in that region. For example, in a regional anycast implementation, a request issued by a client computing device 102 to a shared IP address will arrive at a POP, DNS server component 118, or resource cache component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP, DNS server component, or resource cache component.

As a further specific example, the regional anycast routing mode can involve the selection of a cache IP address from a grouping or list of cache IP addresses or anycast node locations that are located within a certain geographical and/or regional location of the nodes (e.g., U.S. East Coast, U.S. West Coast, Canada, or Southeast Asia). In other embodiments, the CDN service provider 106 can select a cache IP address from a list of IP addresses that are associated with a location of nodes in a region specified by the CDN service provider 106. Accordingly, the CDN service provider 106 can specify certain nodes located in one geographical area (e.g., U.S. West Coast). In some embodiments, such a list may not include an IP address that is deemed unsecure (e.g., an IP address corresponding to a cache server that, due to security concerns, cannot provide requested resources). For example, in some embodiments, financial content such as credit card information may need to be routed with a routing mode offering higher security. In other embodiments, an unsecure IP address may be an anycast IP address that has been leaked, thereby making security a concern for that particular IP address.

In yet another example of determining the appropriate routing mode at block 806, the CDN service provider 106 may select a sloppy routing mode. As further described above, a sloppy routing mode can be used to service content requests from a suboptimal POP if, for example, if the original provider of the specifically requested content (e.g., the original content provider for that content) has exceeded a threshold network usage or if the CDN service provider 106 has exceeded a threshold content delivery bandwidth at data links of cache servers servicing requests for content originally provided by the content provider 104. Accordingly, in various embodiments, the determined routing mode can be the sloppy routing mode.

In one embodiment, as described above, the response to a DNS query utilizing this sloppy routing approach can be either: an alternative resource identifier (e.g., a CNAME) associated with an alternative DNS component at an alternative POP of the CDN service provider or an IP address of a resource cache component (e.g., a cache server) at the alternative POP (e.g., second POP 122). In this approach, the response to the DNS query may be routed to one of several cache servers that may be available at the alternative POP (or even several alternative POPs). In addition, in this embodiment, because the response to the DNS query may be routed to one of several cache servers at the alternative POP, the sloppy routing mode can enhance security because several cache servers are available, rather than one cache server (e.g., the optimal cache server that minimizes latency). In contrast to a default routing mode that may only route the response to a DNS query to one cache server (e.g., a default and/or optimal cache server that can minimize the latency in providing the requested resource) at the POP that received the DNS query, the slopping routing mode can provide enhanced security by routing the response to the DNS query to an alternative cache server at an alternative POP. Further, the sloppy routing mode selection allows the CDN service provider 106 to allocate or direct the response of the DNS query within the network of the CDN service provider 106, for example, to an alternative POP (e.g., second POP 122), which may minimize latency in servicing the resource request when compared to an anycast routing mode. Thus, the CDN service provider 106 can minimize latency by analyzing the request handling capacity of alternative POPs available to provide the requested resource. Accordingly, a sloppy routing mode selection can take into account both minimizing the latency when providing the requested resource and a susceptibility factor by providing enhanced security when providing the requested resource.

In various embodiments, information stored in pricing data store 130 can also be used as the one or more criteria to determine an appropriate routing mode. For example, one pricing structure may dictate that a flat-rate price is available for the default routing mode, a flat-rate price is available for the sloppy routing mode, and another flat-rate price is available for the regional anycast routing mode. Using this data from pricing data store 130 and the network usage, the back-end processing service 132 can determine whether a content provider 104 has exceeded their threshold network usage for a particular routing mode at a particular pricing structure. As one of skill in the art can appreciate, various routing modes are available when the one or more criteria are used in combination with a pricing structure (e.g., a price at which the CDN service provider 106 provides content on behalf of the content provider 104). For example, a content provider 104 can pay more for the CDN service provider 106 to determine whether a more secure routing mode is available for certain resource requests (e.g., resource requests with financial information). In this example, the back-end processing service 132 can determine that a regional anycast routing mode is available with less latency than an anycast routing mode, but also with more security than a default routing mode because the susceptibility factor of the DNS cache server servicing a particular content provider 104 is high.

In addition to the example criteria noted above, the one or more criteria can also include utilizing information obtained from the DNS query, at least in part, to identify the more appropriate routing mode. This information may include a domain associated with the content provider 104. This information may also include client subnet information associated with content provider 104. This information can be used to determine the routing mode.

Next, at block 808, in response to the obtained DNS query, the selected alternative resource identifier or selected cache IP address is transmitted to the client in accordance with the determined routing mode. For example, if the determined routing mode is the regional anycast routing mode, the selected IP cache address (e.g., selected from a list of IP addresses associated with a location of nodes in a region specified by the CDN service provider 106) can be provided and/or transmitted to the client 102 in accordance with the regional anycast routing mode. Thus, an IP address can be selected that is associated with a location of nodes on the US West Coast for example. Thereafter, at block 810, routine 802 ends.

In various embodiments, routine 802 may be performed by the CDN service provider 106 generally, or by DNS server components 118, 124 or individual DNS servers associated with the DNS server components 118,124. The CDN service provider 106, DNS server components 118, 124, or individual DNS servers associated with the DNS server component 118, 124 may themselves include or otherwise access a service to implement the routine 802, such as the routing mode and POP selection service 128 of FIG. 1. In other embodiments, a physical computing device with computer executable instructions may cause the computing device to perform routine 802. In some embodiments of the routine 802, elements may occur in sequences other than as described above. One skilled in the art will appreciate that additional variations are possible and within the scope of the present disclosure.

Figure 9:
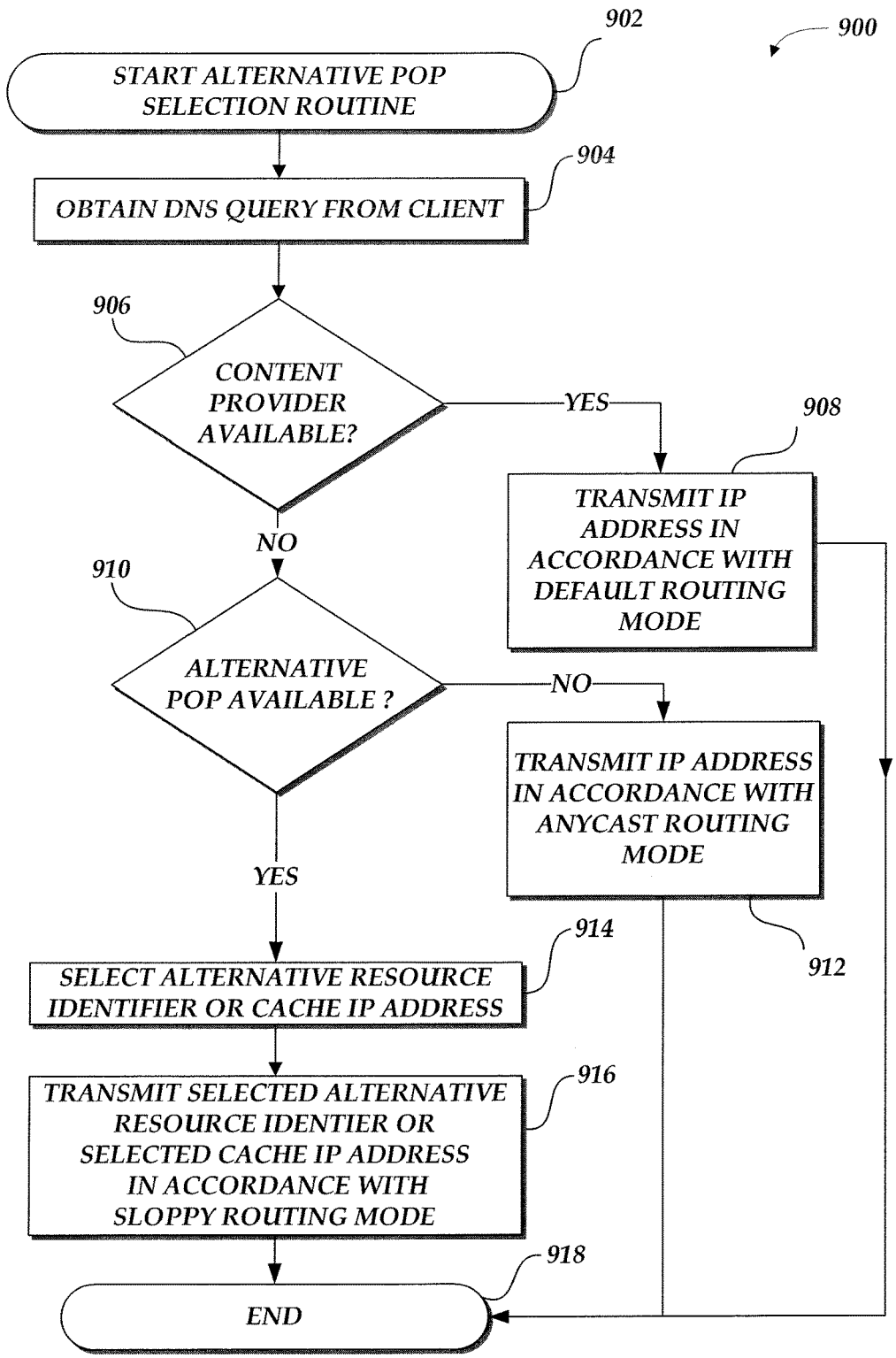
FIG. 9 is a flow diagram illustrative of an alternative POP selection routine implemented by a CDN service provider.

With reference now to FIG. 9, an alternative embodiment of a POP selection routine 902 will be described. One skilled in the relevant art will appreciate that actions/steps outlined for routine 902 may be implemented by one or many computing devices/components that are associated with the CDN service provider 106. Accordingly, routine 902 has been logically associated as being generally performed by the CDN service provider 106, and thus the following illustrative embodiments should not be construed as limiting.

At block 904, a DNS server component 118 at a first POP 116 of the CDN service provider 106 receives a DNS query corresponding to a resource identifier from a client computing device 102. As previously discussed, the resource identifier can be a URL that has been embedded in content requested by the client computing device 102 and previously provided by the content provider 104. Alternatively, the resource identifier can also correspond to a CNAME provided by a content provider DNS server in response to a DNS query previously received from the client computing device 102. While not illustrated, the receiving DNS server also obtains, in some embodiments, an IP address associated with the DNS query from the requesting client computing device 102 ("query IP address"). The query IP address can correspond to an IP address of the client computing device or any local DNS resolver component associated with the client computing device.

Next, at decision block 906, the CDN service provider 106 determines whether a content provider 104 corresponding to a domain associated with the DNS query is available. For example, the content provider 104 may be available if the content provider 104 has available network usage (e.g., network usage not exceeding a threshold network usage) or if no security concerns exist with providing content of the content provider. However, the content provider 104 may not be available if the content provider 104 has exceeded a threshold network usage or if security concerns exist regarding the provision of content originally provided by the content provider 104. For example, a cache server at the resource cache component 120 that is providing requested resources in accordance with a default routing mode for the content provider 104 may be unavailable due to security concerns associated with providing content of the content provider 104. In other embodiments, a content provider 104 may be physically located in a region or location more susceptible to security concerns and thus can have an increased susceptibility factor associated with the default routing mode. Accordingly, the optimal cache server, physically located in that same region or location, that is providing requested resources in accordance with a default routing mode for a particular content provider 104 may be unavailable due to security concerns associated with providing content of that particular content provider 104. In one embodiment, the CDN service provider 106 can determine the susceptibility factor for the content provider 104 associated with each available routing mode of a plurality of routing modes. In the depicted alternative embodiment of the POP selection routine 902, the available routing modes are: the default routing mode, the sloppy routing mode, and the anycast routing mode.

If the content provider 104 is available (i.e., the CDN service provider determines that content originally provided by the content provider 104 is available to be provided based on one or more criteria), the CDN service provider 106, responsive to the DNS query, provides and transmits to the client computing device 102 an IP address of the default or optimal resource cache component of the first POP at block 908 in accordance with the default routing mode. In this embodiment, the resource cache component at the first POP can also be referred to as the default or optimal resource cache component. Thereafter, at block 918, routine 902 ends. Alternatively, if at decision block 906, the content provider is not available, processing continues at decision block 910.

At decision block 910, the CDN service provider 106 determines whether an alternative POP is available. This decision can include determining an appropriate routing mode from the remaining available routing modes: the sloppy routing mode and the anycast routing mode. For example, as described above with reference to FIG. 8, an alternative POP may be available if a list of IP addresses at the DNS server 118 includes alternative cache IP addresses associated with alternative POPs. If an alternative POP is not available (e.g., because the list of IP addresses does not include alternative POP locations or cache IP addresses associated with alternative POPs), at block 912, the CDN service provider 106 responsively provides and transmits to the client computing device 102 an IP address in accordance with the anycast routing mode. In another embodiment not depicted in FIG. 9, the CDN service provider 106 responsively provides and transmits to the client computing device 102 an IP address in accordance with the regional anycast routing mode. In this embodiment, the IP address can be selected in accordance with the determined routing mode as described above with reference to FIG. 8. Thereafter, at block 918, routine 902 ends.

While the routine 902 illustrates making both determinations at blocks 906 and 910, in another embodiment, the determination at block 906 may be optional; while in a yet further alternative embodiment, the determination at block 910 may be optional. For example, in various embodiments, routine 902 can proceed from decision block 906, if the content provider is not available, to block 912, where the CDN service provider 106 responsively provides and transmits to the client computing device 102 an IP address in accordance with the anycast routing mode. Or, in another optional embodiment not depicted in FIG. 9, the CDN service provider 106 can responsively provide and transmit to the client computing device 102 an IP address in accordance with the regional anycast routing mode.

Continuing at block 914, if the content provider is not available at decision block 906 and an alternative POP is available at block 910, the CDN service provider 106 selects an alternative resource identifier associated with an alternative POP of the CDN service provider 106 or an alternative cache IP address associated with an alternative POP. In particular, in one illustrative embodiment, where an alternative resource identifier is selected, the CDN service provider 106 more specifically selects an alternative resource identifier which would resolve to a particular alternative DNS server at the alternative POP. In another illustrative embodiment, where an alternative cache IP address is selected, the CDN service provider 106 may select an alternative cache IP address for a particular cache server of a resource cache component at the alternative POP or generally for a group of cache servers at the alternative POP. In this way, the CDN service provider 106 directs further processing of the request to an alternative POP of the CDN service provider.

Next, at block 916, in response to selecting either an alternative resource identifier or an alternative cache IP address at block 914, the selected alternative resource identifier or alternative cache IP address is transmitted to the client in response to the obtained DNS query for further processing in accordance with the sloppy routing mode. Thereafter, at block 918, routine 902 ends.

In various embodiments, routine 902 may be performed by the CDN service provider 106 generally, or by DNS server components 118, 124 or individual DNS servers associated with the DNS server components 118,124. The CDN service provider 106, DNS server components 118, 124, or individual DNS servers associated with the DNS server component 118, 124 may themselves include or otherwise access a service to implement the routine 902, such as the routing mode and POP selection service 128 of FIG. 1. In other embodiments, a physical computing device with computer executable instructions may cause the computing device to perform routine 902. In some embodiments of the routine 902, elements may occur in sequences other than as described above. In addition, as noted above, some elements of the routine may be optional, such as the determinations at either block 906 or 910. One skilled in the art will appreciate that additional variations are possible and within the scope of the present disclosure.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and method elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method comprising:
   under control of a hardware computing device configured with specific computer executable instructions:
      obtaining, at a first domain name system (DNS) server from a client computing device, a first DNS query, wherein a first point of presence (POP) of a content delivery network (CDN) service provider includes the first DNS server, wherein the first DNS query is associated with a requested resource, wherein the requested resource is associated with a content provider, and wherein the CDN service provider is different from the content provider;
      determining whether the CDN service provider has exceeded a threshold content delivery bandwidth for the first POP, wherein the threshold content delivery bandwidth is determined based at least in part on CDN service provider cost information, wherein the CDN service provider cost information indicates a financial cost of content delivery bandwidth for the CDN service provider, and wherein the threshold content delivery bandwidth is less than a maximum available content delivery bandwidth for the first POP;
      selecting, at the first DNS server, (a) an alternative resource identifier associated with a second DNS server at a second POP of the CDN service provider or (b) an IP address of a cache component associated with the second POP, if the CDN service provider is determined to have exceeded the threshold content delivery bandwidth for the first POP, wherein the alternative resource identifier includes information for causing a second DNS query to resolve to the second DNS server of the CDN service provider, wherein the alternative resource identifier is a uniform resource locator (URL) and wherein the second DNS server or the cache component at the second POP is suboptimal for servicing the requested resource; and
      transmitting, to the client computing device, the alternative resource identifier or the IP address.

2. The computer-implemented method of claim 1, wherein selecting the alternative resource identifier or the IP address is further based at least in part on a determination that the content provider has exceeded a threshold network usage.

3. The computer-implemented method of claim 2, wherein the threshold network usage is determined based at least in part on content provider pricing information, wherein the content provider pricing information includes a flat-rate price for network usage by the content provider.

4. The computer-implemented method of claim 1, wherein the alternative resource identifier is associated with a CNAME.

5. A computer-implemented method comprising:
under control of a hardware computing device configured with specific computer executable instructions:
obtaining, at a first domain name system (DNS) server from a client computing device, a first DNS query, wherein a first point of presence (POP) of a content delivery network (CDN) service provider includes the first DNS server, wherein the first DNS query is associated with a requested resource, and wherein the requested resource is associated with a content provider;
determining whether the CDN service provider has exceeded a threshold content delivery bandwidth for the first POP, wherein the threshold content delivery bandwidth is determined based at least in part on CDN service provider financial cost information;
selecting, at the first DNS server, (a) an alternative resource identifier associated with a second DNS server at a second POP of the CDN service provider or (b) an IP address of a cache component associated with the second POP, if the CDN service provider is determined to have exceeded the threshold content delivery bandwidth for the first POP, wherein the alternative resource identifier includes information for causing a second DNS query to resolve to the second DNS server of the CDN service provider, wherein the alternative resource identifier is a uniform resource locator (URL) and wherein the second DNS server or the cache component at the second POP is suboptimal for servicing the requested resource; and
transmitting, to the client computing device, the alternative resource identifier or the IP address.

6. The computer-implemented method of claim 5, wherein the CDN service provider is different from the content provider.

7. The computer-implemented method of claim 5, wherein the CDN service provider financial cost information indicates a financial cost of content delivery bandwidth for the CDN service provider.

8. The computer-implemented method of claim 7, wherein the financial cost information is associated with costs of data links provisioned by the CDN service provider.

9. The computer-implemented method of claim 5, wherein the threshold content delivery bandwidth is less than a maximum available content delivery bandwidth for the first POP.

10. The computer-implemented method of claim 5, wherein an available content delivery bandwidth for the first POP varies based at least in part on a time of day.

11. The computer-implemented method of claim 10, wherein the available content delivery bandwidth for the first POP is different than a maximum available content delivery bandwidth for another POP of the CDN service provider.

12. The computer-implemented method of claim 5, wherein the alternative resource identifier is selected.

13. The computer-implemented method of claim 12 further comprising:
obtaining a second DNS query from the client computing device at the second DNS server, wherein the second DNS query is associated with the alternative resource identifier provided by the CDN service provider;
selecting a cache component associated with the second POP for providing the requested resource; and
transmitting, to the client computing device, information identifying the selected cache component.

14. The computer-implemented method of claim 5, wherein selecting the alternative resource identifier or the IP address is further based at least in part on a determination that the content provider has exceeded a threshold network usage, wherein the threshold network usage is determined based at least in part on content provider pricing information.

15. A system comprising:
a first point of presence (POP) associated with a content delivery network (CDN) service provider, wherein the first POP includes a first domain name system (DNS) server that receives a first DNS query from a client computing device, wherein the first DNS query is associated with a requested resource associated with a content provider, and wherein the first DNS server is operative to:
determine whether the CDN service provider has exceeded a threshold bandwidth for a first cache component associated with the first POP, wherein the threshold bandwidth is determined based at least in part on CDN service provider financial cost information;
select (a) an alternative resource identifier associated with a second DNS server at a second POP of the CDN service provider or (b) an IP address of a second cache component associated with the second POP, if the CDN service provider is determined to have exceeded the threshold bandwidth for the first cache component associated with the first POP, wherein the alternative resource identifier includes information for causing a second DNS query to resolve to the second DNS server of the CDN service provider, wherein the alternative resource identifier is a uniform resource locator (URL) and wherein the second DNS server or the cache component at the second POP is suboptimal for servicing the requested resource; and
transmit, to the client computing device, the alternative resource identifier or the IP address.

16. The system of claim 15, wherein the CDN service provider is different from the content provider.

17. The system of claim 15, wherein the CDN service provider financial cost information indicates a financial cost of content delivery bandwidth for the CDN service provider.

18. The system of claim 15, wherein the threshold content delivery bandwidth is less than a maximum available content delivery bandwidth for the first POP.

19. The system of claim 15, wherein the first DNS server is further operative to:
determine whether the content provider has exceeded a threshold network usage, wherein the threshold network usage is determined based at least in part on content provider pricing information.

20. The system of claim 19, wherein selecting the alternative resource identifier or the IP address is further based at least in part on the determination of whether the content provider has exceeded a threshold network usage.

* * * * *